(12) United States Patent
Chang et al.

(10) Patent No.: US 7,644,052 B1
(45) Date of Patent: Jan. 5, 2010

(54) SYSTEM AND METHOD OF BUILDING AND USING HIERARCHICAL KNOWLEDGE STRUCTURES

(75) Inventors: Walter Chang, San Jose, CA (US); Nadia Ghamrawi, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 297 days.

(21) Appl. No.: 11/368,130

(22) Filed: Mar. 3, 2006

(51) Int. Cl.
*G06N 5/00* (2006.01)
*G06F 17/00* (2006.01)

(52) U.S. Cl. .......................... 706/45; 707/5
(58) Field of Classification Search .............. 706/45; 704/9, 222, 257; 707/3, 5
See application file for complete search history.

(56) References Cited

U.S. PATENT DOCUMENTS

| | | | |
|---|---|---|---|
| 7,165,058 B2 | 1/2007 | Coen | |
| 2003/0120642 A1 | 6/2003 | Egilsson et al. | |
| 2005/0257194 A1 | 11/2005 | Morrow et al. | |
| 2006/0123009 A1 | 6/2006 | Bruno et al. | |
| 2006/0161544 A1* | 7/2006 | Lee et al. | 707/6 |
| 2007/0156622 A1* | 7/2007 | Akkiraju et al. | 706/48 |
| 2007/0208693 A1 | 9/2007 | Chang et al. | |
| 2007/0266020 A1* | 11/2007 | Case et al. | 707/5 |

FOREIGN PATENT DOCUMENTS

EP 1156432 11/2001

OTHER PUBLICATIONS

"About WordNet". Retrieved from the Internet: <URL: http://wordnet.princeton.edu>, 2 pages (accessed on Jan. 21, 2006).
Agirre, Eneko et al., "Enriching very large ontologies using the WWW", in Proceedings of the Ontology Learning Workshop, ECAI, Berlin, Germany, 2000. Retrieved from the Internet: <URL:http://citeseer.ist.psu.edu/agirre00enriching.html>, 6 pages (accessed Dec. 20, 2005).
Berka, Petr et al., "Discretization and grouping: preprocessing steps for Data Mining", Principles of Data Mining and Knowledge Discovery. LNAI 1510. Springer, 1998. Retrieved from the Internet: <URL: http://citeseer.ist.psu.edu/berka98discretization.html>, 7 pages (accessed on Dec. 20, 2005).

(Continued)

*Primary Examiner*—David R Vincent
*Assistant Examiner*—Kalpana Bharadwaj
(74) *Attorney, Agent, or Firm*—Fish & Richardson P.C.

(57) ABSTRACT

The present disclosure includes systems and techniques relating to building and using hierarchical knowledge structures. In general, embodiments of the invention feature a computer program product and a method including receiving a first ontology including initial categories, an indication of sample data for a given category of the initial categories, and an indication of symbolic knowledge for the given category; and populating the first ontology with new features to form a second ontology, the populating comprising determining the new features from the sample data using a statistical machine learning process and retaining the new features and the symbolic knowledge within the second ontology in association with the given category. In another aspect, embodiments of the invention feature a knowledge management system including a hierarchical knowledge structure that categorizes information according to cognitive and semantic qualities within a knowledge domain.

36 Claims, 9 Drawing Sheets

OTHER PUBLICATIONS

Bisson, Gilles et al., "Designing clustering methods for ontology building: The Mo'K workbench", in Proceedings of the ECAI Ontology Learning Workshop, Berlin, Aug. 2000, Staab, S. and Maedche, A. and Nedellec C., (Eds.). Retrieved from the Internet: <URL: http://citeseer.ist.psu.edu/bisson00designing.html>, 6 pages (accessed on Dec. 20, 2005).

"The Boost Graph Library (BGL)". Retrieved from the Internet: <URL: http://boost.org/libs/graph/doc/>, 4 pages (accessed on Jun. 2, 2006).

Celko, Joe. "Graphs, Trees, and Hierarchies", Trees and Hierarchies in SQL for Smarties. Retrieved from the Internet: <URL:http://www.dbazine.com/ofinterest/oi-articles/celko24>, 10 pages (accessed on Jun. 2, 2006).

Cimiano, Philipp et al., "Conceptual Knowledge Processing with Formal Concept Analysis and Ontologies", in Concept Lattices: Second International Conference on Formal Concept Analysis, ICFCA 2004 Sydney, Australia, Feb. 23-26, 2004 Proceedings. Retrieved from the Internet: <URL: http://www.aifb.uni-karlsruhe.de/WBS/pci/icfca04.pdf>, 18 pages (accessed on Dec. 20, 2005).

Dougherty, James et al., "Supervised and Unsupervised Discretization of Continuous Features", in Proceedings of the Twelfth International Conference on Machine Learning, Tahoe City, CA, 1995. Retrieved from the Internet: <URL: http://citeseer.ist.psu.edu/dougherty95supervised.html>, 9 pages (accessed on Dec. 19, 2005).

Faure, David et al., "A Corpus-based Conceptual Clustering Method for Verb Frames and Ontology Acquisition", in LREC workshop on Adapting lexical and corpus resources to sublanguages and applications, Granada, Spain, May 1998. Retrieved from the Internet: <URL: http://citeseer.ist.psu.edu/faure98corpusbased.html>, 8 pages (accessed on Dec. 19, 2005).

Fayyad, Usama et al., "Multi-Interval Discretization of Continuous-Valued Attributes for Classification Learning", in Proceedings of the $13^{th}$ International Joint Conference on Artificial Intelligence, vol. 2, pp. 1022-1027 (1993).

Holte, Robert C., "Very Simple Classification Rules Perform Well on Most Commonly Used Datasets", Machine Learning, 11:63-91 (1993).

ISO 2788:1986, "Documentation—Guidelines for the establishment and development of monolingual thesauri". Retrieved from the Internet: <URL: http://www.collectionscanada.ca/iso/tc46sc9/standard/2788e.html>, 5 pages (accessed on Feb. 21, 2006).

Liu, Huan et al., "Chi2: Feature Selection and Discretization of Numeric Attributes", in Proceedings of 7th IEEE International Conference on Tools with Artificial Intelligence, 1995. Retrieved from the Internet: <URL: http://citeseer.ist.psu.edu/liu95chi.html>, 4 pages (accessed on Dec. 19, 2005).

Maedche, Alexander et al., "Discovering Conceptual Relations From Text", Technical Report 399, Institute AIFB, Karlsruhe University, 2000. Retrieved from the Internet: <URL: http://citeseer.ist.psu.edu/maedche00discovering.html>, 5 pages (accessed on Dec. 20, 2005).

McGregor, Colin. "Oracle Text Application Developer's Guide Release 9.2", Mar. 2002. Retrieved from the Internet: <http://www.utexas.edu/its/unix/reference/oracledocs/v92/B10501_01/text.920/a96517/toc.htm>, 220 pages (accessed on Feb. 21, 2006).

National Information Standards Organization (NISO), "Guidelines for the Construction, Format, and Management of Monolingual Thersauri", pp. 1-60 (1994).

Niedermayer, Daryle. "An Introduction to Bayesian Networks and their Contemporary Applications", Dec. 1998. Retrieved from the Internet: <URL: http://www.niedermayer.ca/papers/bayesian>, 17 pages (accessed on Jan. 19, 2006).

OWL Web Ontology Language Overview, D.L. McGuinness and F. van Harmelen (Eds.). W3C Recommendation Feb. 10, 2004. Retrieved from the Internet: <URL: http://www.w3.org/TR/owl-features/>, 15 pages (accessed on Feb. 21, 2006).

Papadimitriou, Christos H. et al., "Latent Semantic Indexing: A Probabilistic Analysis", in Proceedings of the ACM Conference on Principles of Database Systems (PODS), Seattle (to appear), 1998. Retrieved from the Internet: <URL: http://citeseer.ist.psu.edu/article/papadimitriou97latent.html>, 21 pages (accessed on Jan. 18, 2006).

Pereira, Fernando et al., "Distributional Clustering of English Words" (1994); 30th Annual Meeting of the ACL. Retrieved from the Internet: <URL:http://citeseer.ist.psu.edu/pereira93distributional.html>, 9 pages (accessed on Dec. 20, 2005).

Perner, Petra et al., "Multi-Interval Discretization Methods for Decision Tree Learning", Advances in Pattern Recognition, A. Amin, D. Dori, P. Pudil, and H. Freeman (Eds.), LNCS 1451, Springer Verlag, pp. 475-482 (1998).

Quinlan, J.R., "Simplifying Decision Trees", AI Memo No. 930, Massachusetts Institute of Technology Artificial Intelligence Laboratory, pp. 1-16, Dec. 1986.

Quinlan, J.R., "Induction of Decision Trees", Machine Learning, 1: 81-106 (1986).

Ratanamahatana, Chotirat Ann, "CloNI: Clustering of $\sqrt{N}$—Interval discretization", in Proceedings of the $4^{th}$ International Conference on Data Mining Including Building Application for CRM & Competitive Intelligence, Rio de Janeiro, Brazil, Dec. 2003. Retrieved from the Internet: <URL: http://citeseer.ist.psu.edu/695743.html>, 10 pages (accessed on Dec. 20, 2005).

Reinberger, Marie-Laure et al., "Unsupervised Text Mining for the Learning of DOGMA-inspired Ontologies", Ontology Learning from Text: Methods, Evaluation and Applications, P. Buitelaar, P. Cimiano, and B. Magnini editors, IOS Press 2005. Retrieved from the Internet: <URL: http://www.cnts.ua.ac.be/~mlr/files/reinberger_spynsIOS_revised.pdf>, 15 pages (accessed on Dec. 20, 2005).

Seo, Young-Woo et al., "Feature Selection for Extracting Semantically Rich Words", tech. report CMU-RI-TR-04-18, Robotics Institute, Carnegie Mellon University, Mar. 2004. Retrieved from the Internet: <URL: http://citeseer.ist.psu.edu/seo04feature.html>, 11 pages (accessed on Feb. 21, 2006).

Seo, Young-Woo et al., "Feature Selections for Extracting Semantically Rich Words for Ontology Learning", Proceedings of Dagstuhl Seminar Machine Learning for the Semantic Web, Feb. 2005. Retrieved from the Internet: <URL: http://www.smi.ucd.ie/Dagstuhl-MLSW/proceedings/>, 5 pages (accessed on Feb. 21, 2006).

Shamsfard, Mehmoush et al., "Learning Ontologies from Natural Language Texts", International Journal of Human Computer Studies, 60:17-63 (2004).

Yang, Stewart et al., "Relative Term-Frequency Based Feature Selection For Text Categorization", The 2002 International Conference on Machine Learning and Cybernetics, Beijing, 2002. Retrieved from the Internet: <URL: http://www.cs.utexas.edu/~windtown/publications.html>, 6 pages (accessed on Dec. 20, 2005).

Yang, Yiming et al., "A Comparative Study on Feature Selection in Text Categorization", in Proceedings of the 14th International Conference on Machine Learning ICML97. Retrieved from the Internet: <URL: http://citeseer.ist.psu.edu/yang97comparative.html>, 9 pages (accessed on Dec. 20, 2005).

Yang, Ying et al., "A Comparative Study of Discretization Methods for Naive-Bayes Classifiers", in *Proceedings of the 2002 Pacific Rim Knowledge Acquisition Workshop (PKAW'02)*, Yamaguchi, T., A. Hoffmann, H. Motoda, and P. Compton (Eds.), Japanese Society for Artificial Intelligence. Tokyo, Japan. Retrieved from the Internet: <URL: http://citeseer.ist.psu.edu/588336.html>, 16 pages (accessed on Dec. 20, 2005).

Zheng, Zhaohui et al., "Feature Selection for Text Categorization on Imbalanced Data", Sigkdd Explorations, 6 (1): 80-89 (2004).

Mülhausen, Dorothée, Authorized Officer, PCT International Application PCT/US2007/063105, in International Preliminary Report, mailed Sep. 18, 2008, 7 pages.

Quader, Fazlul, Examiner, in U.S. Appl. No. 11/433,139, Notice of Allowance dated Apr. 23, 2009, 18 pages. (published by the USPTO).

Quader, Fazlul, Examiner, in U.S. Appl. No. 11/433,139, Office Action dated Jan. 9, 2009, 21 pages (published by the USPTO).

Quader, Fazlul, Examiner, in U.S. Appl. No. 11/433,139, Office Action dated Jun. 9, 2008, 21 pages (published by the USPTO).

* cited by examiner

DAG Path Table

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | (1) (2) (4) (6) |
| 6 | L(5) | (1) (5) |
| 7 | L(4) | (1) (5) (4) |
| 8 | L(6) | (1) (5) (4) (6) |
|   |   |   |

DAG Path Table

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | (1) (2) (4) (6) |
| 6 | L(5) | (1) (5) |
| 7 | L(4) | (1) (5) (4) |
| 8 | L(6) | (1) (5) (4) (6) |
| 9 | L(7) | (1) (2) (7) |
|   |   |   |

DAG Path Table

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | (1) (2) (4) (6) |
| 6 | L(5) | (1) (5) |
| 7 | L(4) | (1) (5) (4) |
| 8 | L(6) | (1) (5) (4) (6) |
| 9 | L(7) | (1) (2) (7) |

| Path ID | Leaf ID | Path Node List |
|---|---|---|
| 10 | L(8) | (1) (2) (4) (8) |
| 11 | L(8) | (1) (5) (4) (8) |

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | P4 (6) |
| 6 | L(5) | (1) (5) |
| 7 | L(4) | (1) (5) (4) |
| 8 | L(6) | P7 (6) |

FIG. 7E

| Path ID | Leaf ID | Path Node List |
|---|---|---|
| 1 | L(1) | (1) |
| 2 | L(2) | (1) (2) |
| 3 | L(3) | (1) (2) (3) |
| 4 | L(4) | (1) (2) (4) |
| 5 | L(6) | C (4) (6) |
| 6 | L(5) | (1) (5) |
| 7 | L(4) | (1) (5) (4) |

FIG. 7F

SYSTEM AND METHOD OF BUILDING AND USING HIERARCHICAL KNOWLEDGE STRUCTURES

CROSS-REFERENCE TO RELATED APPLICATIONS

This application is related to U.S. Patent Application No. 60/778,869, entitled "SYSTEM AND METHOD OF EFFICIENTLY REPRESENTING AND SEARCHING DIRECTED ACYCLIC GRAPH STRUCTURES IN DATABASES", to Walter Chang, Nadia Ghamrawi and Arun Swami, which was filed on Mar. 3, 2006. The disclosure of the above application is incorporated herein by reference in its entirety.

REFERENCE TO APPENDIX ON COMPACT DISC

This patent application is supplemented by a technical appendix submitted on compact disc, which conforms to the International Standards Organization (ISO) 9660 standard, showing example ontologies saved as plain text files in American Standard Code for Information Interchange (ASCII) format; the submitted technical appendix includes two files entitled "DocTypes-SeedOnto.txt" (created Feb. 16, 2006 and being 2,589 bytes in size (4,096 bytes used)) and "DocTypes-AugmOnto.txt" (created Feb. 16, 2006 and being 56,119 bytes in size (57,344 bytes used)); the submitted technical appendix is hereby incorporated by reference in its entirety.

BACKGROUND

The present disclosure relates to content management systems, and in particular, to creating and using hierarchical knowledge structures.

The ability to automatically classify and categorize content is an important problem in content management systems. The need to categorize content occurs in both consumer and enterprise related content work flows. Numerous methods have been developed to address this problem. These methods typically use either symbolic knowledge representation or statistical machine learning techniques.

A symbolic knowledge representation is typically referred to as an ontology. In computer science, an ontology generally refers to a hierarchical knowledge structure that contains a vocabulary of terms and concepts for a specific knowledge domain, such as Bioinformation, and contains relevant inter-relationships between those terms and concepts. Symbolic knowledge generally refers to knowledge represented explicitly through precise domain vocabulary words (e.g., "Gene") and their explicit relationship to other words (e.g., "has sub-type" "recessive gene").

A traditional symbolic knowledge ontology is typically constructed by hand by one or more domain experts (e.g., biologists), and such ontologies are often very detailed and precise, which can present difficulties in search and categorization applications. In a symbolic ontology, a team of human domain experts will typically define the top level categories which form the structure of the ontology, and then manually fill in this structure. Human knowledge engineers also maintain and update this structure as new categories are created or discovered.

For large symbolic ontologies, a tree structure of ontology nodes is frequently created and stored in a database. A database structure called an Adjacency List is normally used. The Adjacency List typically consists of pairs of nodes, each pair representing a parent-child connection between nodes.

Another approach used in content management systems involves machine learning techniques. In computer science, machine learning typically refers to a class of algorithms that generally employ statistical and probabilistic analysis methods to learn information from designated sample data (typically example documents also known as document "training sets"). In contrast with symbolic knowledge methods, machine learning methods represent knowledge in fuzzier and less precise ways, which can provide benefits in terms of scalability and ease of document classification.

In a machine learning system (which may or may not use an ontology) a set of training documents is identified for each category, and the system "learns" the relevant features (keywords and phrases) for each category. When a new document is presented to the system, the document's features are extracted and statistically compared to training document features previously extracted by the machine learning system. The result of the comparison is a set of categories and scores that best match the likely topics in the new document. This approach is scalable but can be very sensitive to the data in the document training set.

There are numerous ontology standards, building and editing tools, and ontology-based document classification systems. Existing ontology products build and edit symbolic ontologies, and various standards exist that describe the semantics of these ontologies. In particular, ISO-39.19 and W3C OWL-DAML using RDF (Resource Description Framework) are common methods for specifying symbolic ontologies. Existing ontology products include those from Ontology Works, Inc. (of Odenton, Md.), Semio Corporation (of San Mateo, Calif.), International Business Machines (IBM) Corporation (of Armonk, N.Y.), Oracle Corporation (of Redwood City, Calif.), Autonomy Corporation (of San Francisco, Calif.), ClearForest Corporation (of Waltham, Mass.), and Stratify, Inc. (of Mountain View, Calif.). In addition, existing classification systems use machine learning techniques such as Latent Semantic Indexing or Bayesian Networks.

SUMMARY

This specification discloses various embodiments of technologies for creating hybrid hierarchical knowledge structures that combine both symbolic and machine learned knowledge. In general, embodiments of the invention feature a computer program product and a method including receiving a first ontology including initial categories, an indication of sample data for a given category of the initial categories, and an indication of symbolic knowledge for the given category; and populating the first ontology with new features to form a second ontology, the populating including determining the new features from the sample data using a statistical machine learning process and retaining the new features and the symbolic knowledge within the second ontology in association with the given category.

These and other embodiments can optionally include one or more of the following features. The sample data can include sample documents. The determining can include extracting attributes from the sample documents; calculating a statistical concept-distance metric for the attributes; selecting a first subset of the attributes that are more distinguishing with respect to the sample documents based on the calculated statistical concept-distance metric for the attributes and a first user-controllable input; and selecting a second subset of the first attribute subset based on the given category and a relevance measure for attributes in the first attribute subset with respect to the given category, the relevance measure being affected by a second user-controllable input; wherein the new features include attributes in the second attribute subset.

The calculating can include calculating information gain for an attribute A in relation to documents S and categories C by which the documents S are grouped, and calculating the information gain can include handling separately a subset of the documents S, for which the attribute A is absent, to improve performance with respect to populating sub-concepts in the second ontology. The handling separately can include using a fraction of entropy associated with the document subset for which the attribute A is absent. Moreover, calculating the information gain can include calculating a smoothed zero-value information gain (SZVIG) in accordance with an equation:

$$SZVIG(A) = H(S) - \frac{1}{C} \cdot \frac{|S^{A=0}|}{|S|} H(S^{A=0}) - \sum_{v \in V_A, v \neq 0} \frac{|S^{A=v}|}{|S|} H(S^{A=v}),$$

wherein $V_A$ is a set of values v for the attribute A for the documents S, $S^{A=v}$ is a partition of the documents S based on $V_A$, and H(x) is a determined entropy of a set x.

The determining can include discretizing frequency values $V_A$ for the attribute A in the documents S based on a statistical variance of the frequency values $V_A$; and wherein input for the calculating the information gain includes the discretized frequency values. The discretizing can include grouping the frequency values $V_A$ based on a maximum per-group variance determined according to a third user-controllable input.

The determining can include determining a variance in the calculated statistical concept-distance metric for the attributes, and selecting the first subset can include selecting the first subset based on the first user-controllable input combined with the determined variance in the calculated statistical concept-distance metric for the attributes. The determining can include determining a variance in frequency values for the attributes, and the relevance measure can be affected by the second user-controllable input combined with the determined variance in the frequency values for the attributes.

The indication of symbolic knowledge can include a tag and a keyword, the tag indicating an existing symbolic ontology, and the populating can include mining the existing symbolic ontology based on the keyword to obtain the symbolic knowledge. The existing symbolic ontology can include a public ontology of an online lexical reference system, and the mining can include accessing the online lexical reference system over a network. The indication of sample data can include a second tag and references to sample documents, the second tag indicating the statistical machine learning process selected from multiple available statistical machine learning processes.

Operations effected by the computer program product, and the method, can further include receiving a query; and retrieving information from the second ontology based on the query, where the retrieving includes combining contributions of pertinence, with respect to the query, from the machine-learned new features and the symbolic knowledge. The query can include a balancing factor, and the combining can include adjusting the contributions from the machine-learned new features and the symbolic knowledge based on the balancing factor. The query can include a document, and the retrieving can include identifying a category for the document. In addition, the query can include a search string, and the retrieving can include identifying a document related to the search string; and obtaining information associated with the identified document.

In another aspect, embodiments of the invention feature a knowledge management system including a hierarchical knowledge structure that categorizes information according to cognitive and semantic qualities within a knowledge domain, the hierarchical knowledge structure including discrete knowledge types included within a common information category of the hierarchical knowledge structure, the discrete knowledge types including knowledge represented explicitly through domain vocabulary words and relationships among the domain vocabulary words, and the discrete knowledge types including knowledge represented as designated sample data to be processed using statistical machine learning analysis, wherein the knowledge management system includes a computer program product operable to cause data processing apparatus to process the discrete knowledge types and to effect a programming interface used to access the hierarchical knowledge structure; and a document handling system configured to use the programming interface to access and obtain information from the knowledge management system.

The computer program product can be operable to cause data processing apparatus to perform operations including extracting attributes from the designated sample data; calculating a statistical concept-distance metric for the attributes; selecting a first subset of the attributes that are more distinguishing with respect to the designated sample data based on the calculated statistical concept-distance metric for the attributes and a first user-controllable input; selecting a second subset of the first attribute subset based on the given category and a relevance measure for attributes in the first attribute subset with respect to the given category, the relevance measure being affected by a second user-controllable input; and augmenting the hierarchical knowledge structure with the second attribute subset.

The computer program product can be operable to cause data processing apparatus to perform operations including mining an existing symbolic knowledge resource based on a keyword; and augmenting the hierarchical knowledge structure with results of the mining to add to the knowledge represented explicitly through domain vocabulary words and relationships among the domain vocabulary words. Moreover, the computer program product can be operable to cause data processing apparatus to perform operations including retrieving information from the hierarchical knowledge structure based on a received query, the retrieving can include combining contributions of pertinence, with respect to the received query, from the discrete knowledge types.

The document handling system can include an enterprise workflow system. The document handling system can include a resource management system. The document handling system can include a content management system. Moreover, other system implementations are also possible.

Particular embodiments of the invention can be implemented to realize one or more of the following advantages. A knowledge domain can be more efficiently and comprehensively represented. Significant improvements in both the precision and recall of user queries to find relevant content can be realized. Moreover, the ability of a knowledge management system to classify and categorize new content can also be significantly improved.

An ontology can include both symbolic knowledge and machine learned knowledge, where the ontology employs a common ontology representation for both symbolic and machine learned features. This hybrid ontology can be more readily scalable and useful in search and categorization applications, and can also capture explicit semantics (e.g., that a recessive gene is a type of gene). The ontology system presented in this document can provide a framework or language for several kinds of knowledge aggregation within the same ontology, and the process of evaluation of query results can then exploit this framework/language. The framework can provide a reusable infrastructure for interpreting text documents several ways. The process for growing and extending an ontology can use statistical and symbolic methods, including new statistical methods described herein. Information gain can be used as a statistical method, together with feature discretization and feature relevance selection, to populate the ontology with new concepts. The feature discretization can include a variance based attribute discretization that can be used in preprocessing feature vectors to improve accuracy of information gain calculations. Moreover, the attribute discretization described can provide a way of discretizing a set of real numbers based on a user-controllable clustering of their values, with reduced computationally requirements and without dependence on observing the assignments of the feature values to specific categories.

The described information theoretic and statistical methods can be particularly amenable to supporting the construction and simultaneous use of multiple disparate ontologies constructed in a similar way using the same data but different initial groupings of documents. The constructed ontologies can be used to rank and categorize query documents by comparing the terms in the query documents to individual nodes and their surrounding nodes. Thus, appropriate categories can be discovered for newly received documents using an ontology knowledge structure built using both symbolic and machine learned knowledge.

Multiple approaches to building and maintaining ontologies can be combined into one knowledge management system. A hybrid ontology system and associated language for incorporating multiple kinds of symbolic and statistical methods, as described, can represent varying symbolic and statistical relationships in one structure. The traditionally labor intensive nature of building and maintaining ontologies can be reduced, a customized information gain technique can be employed to improve identification of sub-categories within an ontology, and a variance threshold approach to selecting and assigning features to ontology node categories can result improved machine-learned features in an ontology. Learning from examples can assist the identification of sub-categories. Moreover, using symbolic knowledge from public ontologies to augment statistical knowledge can further assist the development of sub-categories, which may not otherwise be represented sufficiently by the examples in a given context.

Both explicit symbolic and relational knowledge can be imparted from formal taxonomy or ontology structures, as well as machine knowledge acquired through statistical machine learning techniques. This can enable various implementations across a broad range of classification applications requiring automatic organization of information or documents. The ability to capture symbolic knowledge into an ontology structure can allow explicit concepts and terms and their interrelationships to be directly incorporated into the ontology to assist in classification and query tasks.

Machine learning algorithms typically learn from examples via statistical processing, resulting in models of a domain that can be used to make predictions about that domain. However, such models often include considerable noise and errors. Such models also tend to be abstract models for which augmentation with other knowledge is difficult, if not impossible to accomplish in a meaningful way. The present systems and techniques can be used to deduce meaningful relations from statistically trained models and incorporate that into a single ontology representing one, common model. By exploiting suitable learning methods (such as the information gain and the variance threshold methods described) in building an ontology structure, the present systems and techniques can gain the advantages of statistical and probabilistic knowledge that has been gleaned from examples, as well as the advantages of a model representation that allows for augmentation of external knowledge, such as symbolic knowledge or other knowledge also deduced from statistically trained models.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 7E shows an example DAG path table with path compression.

FIG. 7F shows another example DAG path table with path compression.

Like reference numbers and designations in the various drawings indicate like elements.

DETAILED DESCRIPTION

As used herein, the word "document" refers to an electronic document. An electronic document (which for brevity will simply be referred to as a document) does not necessarily correspond to a file. A document may be stored in a portion of a file that holds other documents, in a single file dedicated to the document in question, or in multiple coordinated files.

The present application generally involves combining aspects of both symbolic and machine learning categorization techniques to allow machine learning processes to be more selective while still working well with employed symbolic methods, and to allow automatic creation of knowledge structures, called ontologies, which represent domain-specific knowledge. These knowledge structures can be used to automatically classify and organize content, such as text documents, image documents, or any documents containing metadata (any tagged media).

Figure 1:
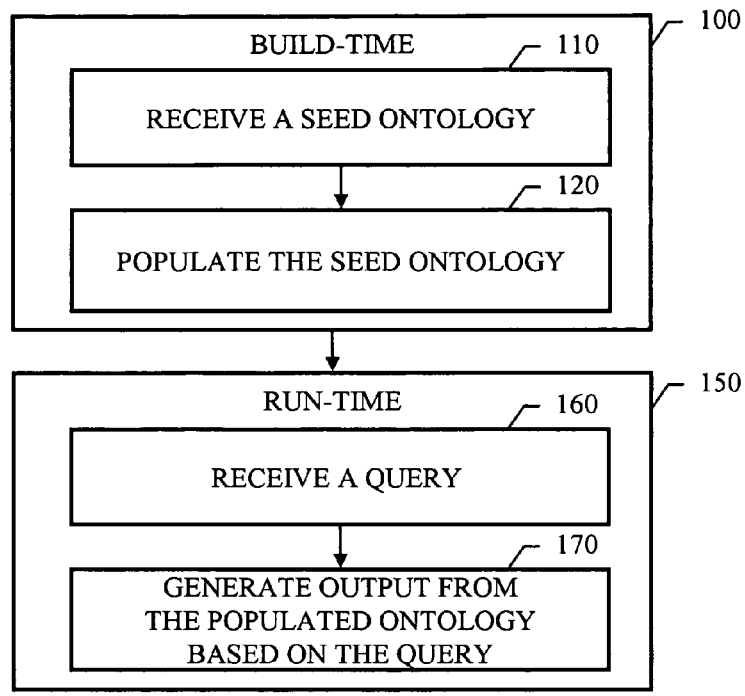
FIG. 1 is a flowchart showing an example process of creating and using an ontology.

FIG. 1 is a flowchart showing an example process of creating and using an ontology. The process is generally broken up into two primary stages, or modes of operation: build-time 100 and run-time 150. During build-time 100, a first (or seed) ontology is received at 110. The seed ontology includes initial categories (e.g., a hierarchy of topics), an indication of sample data (e.g., sample documents of an enterprise) for a given category of the initial categories, and an indication of symbolic knowledge (e.g., knowledge derived through analysis of cognitive and semantic qualities of a knowledge domain, as opposed to knowledge derived through a purely statistical analysis of features from a corpus) for the given category. This seed ontology is then populated at 120 with new features to create a new larger (populated) ontology. The populating can involve determining the new features from the sample data using statistical machine learning techniques and retaining the new features and the symbolic knowledge within the second ontology in association with the given category. Thus, the ontology knowledge structure is built using both symbolic and machine learned knowledge.

During run-time 150, a query is received at 160. This query can be a document or a user entered search string. Then, output from the populated ontology can be generated at 170 based on the query. For example, a new document can be submitted to a knowledge management system, which can automatically search and classify the new document against the created ontology to produce a set of ranked categories that correspond to the most likely topics in the new document. User entered search strings can be treated in a similar manner to identify a set of ranked categories that correspond to the most likely topics in the search string. Moreover, the output can be the set of ranked categories, a highest ranked category, or information derived from such category information (e.g., a set of keywords that can be used in archiving a new document, or additional information obtained by drawing an inference from an identified category to information being sought by the user who entered the search string).

Figure 2:
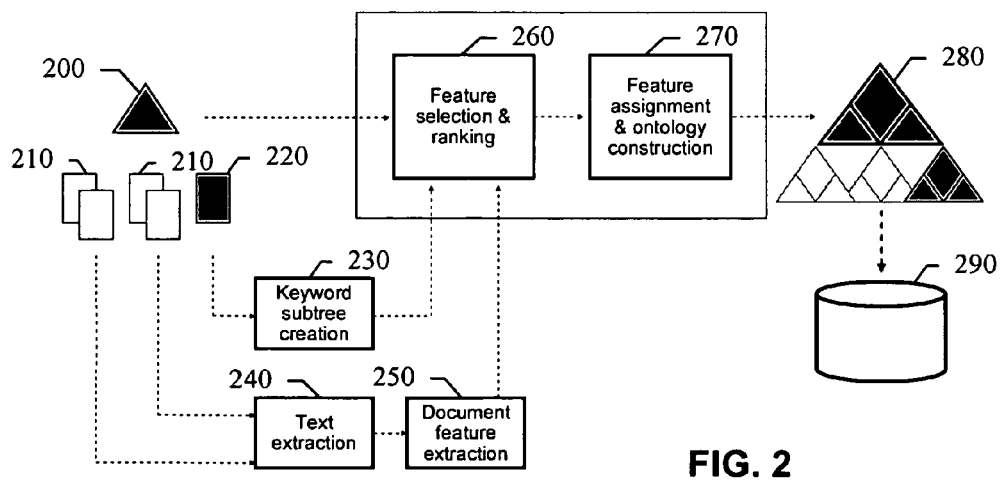
FIG. 2 is a block diagram showing an example process of building an ontology.

FIG. 2 is a block diagram showing an example process of building an ontology. A seed ontology 200 can be created by a user. This seed ontology 200 forms the upper level of the desired categorization hierarchy. The user can also specify a set of example documents 210 for one or more of the categories in the seed ontology 200. In addition, the user can specify explicit keywords 220 for one or more of the categories of the seed ontology 200.

The example documents 210 can be processed using statistical machine learning techniques (e.g., by the information gain and feature selection learning algorithms described) to discover vocabulary and terms relevant to a given category. Text data can be extracted at 240 from the documents 210. This text data can be pulled from the body of the documents 210, from metadata for the documents 210, or both. Feature extraction can then be performed at 250 on the text data using relatively simple lexical tokenization algorithms (e.g., a feature extractor consisting of a natural language tokenizer and/or shallow parser), or more sophisticated commercial semantic entity extractors. A document feature extractor is used to identify and extract semantic entities such as person, company, product, city names, or logical noun groups. Various known commercial products can provide this feature extractor capability (e.g., ThingFinder software provided by Inxight of Sunnyvale, Calif., or Machinese software provided by Connexor Oy of Helsinki, Finland).

A feature is an attribute of a content object that is atomic and potentially useful in distinguishing one content object from another (note that a feature/attribute can be a single word or a phrase). A collection of features from a single document can be used to form a feature vector (a collection of features associated with a content object). As used herein, the word "features" encompasses the possible use of a feature vector for a document.

The keywords 220 can be used to populate symbolic knowledge subtrees at 230 from public ontologies such as WORDNET® 2.1 (available from the Cognitive Science Laboratory at Princeton University, of Princeton, N.J.). The symbolic knowledge subtrees can be provided along with the extracted document features to populate the seed ontology 200. In addition, the extracted document features can be initially stored in a database, and then retrieved by a feature selection process at 260 to identify and rank the most distinguishing features. The most significant (valuable) and distinguishing features can then be selected by an augmentation process at 270 (feature assignment and ontology construction), which uses selected features to build a new ontology 280. This new ontology 280 can be stored in a database 290, such as a relational or object-oriented database.

The ontology 280 can simultaneously represent both symbolic and machine learned features. The ontology 280 can be represented as a directed acyclic graph (DAG) of nodes, where an ontology node describes or signifies a concept, which can be recorded by a body of text. An ontology node can include references to both symbolic and statistical knowledge sources for the concept of the node. For example, the ontology node can include sub-nodes (which can be sub-trees) together with data from the original seed ontology and data acquired during the ontology building process. A sub-node can be identified by a tag that indicates a type for the sub-node, and thus also indicates an extraction method (or point of view) for the knowledge contained in the sub-node.

Figure 3:
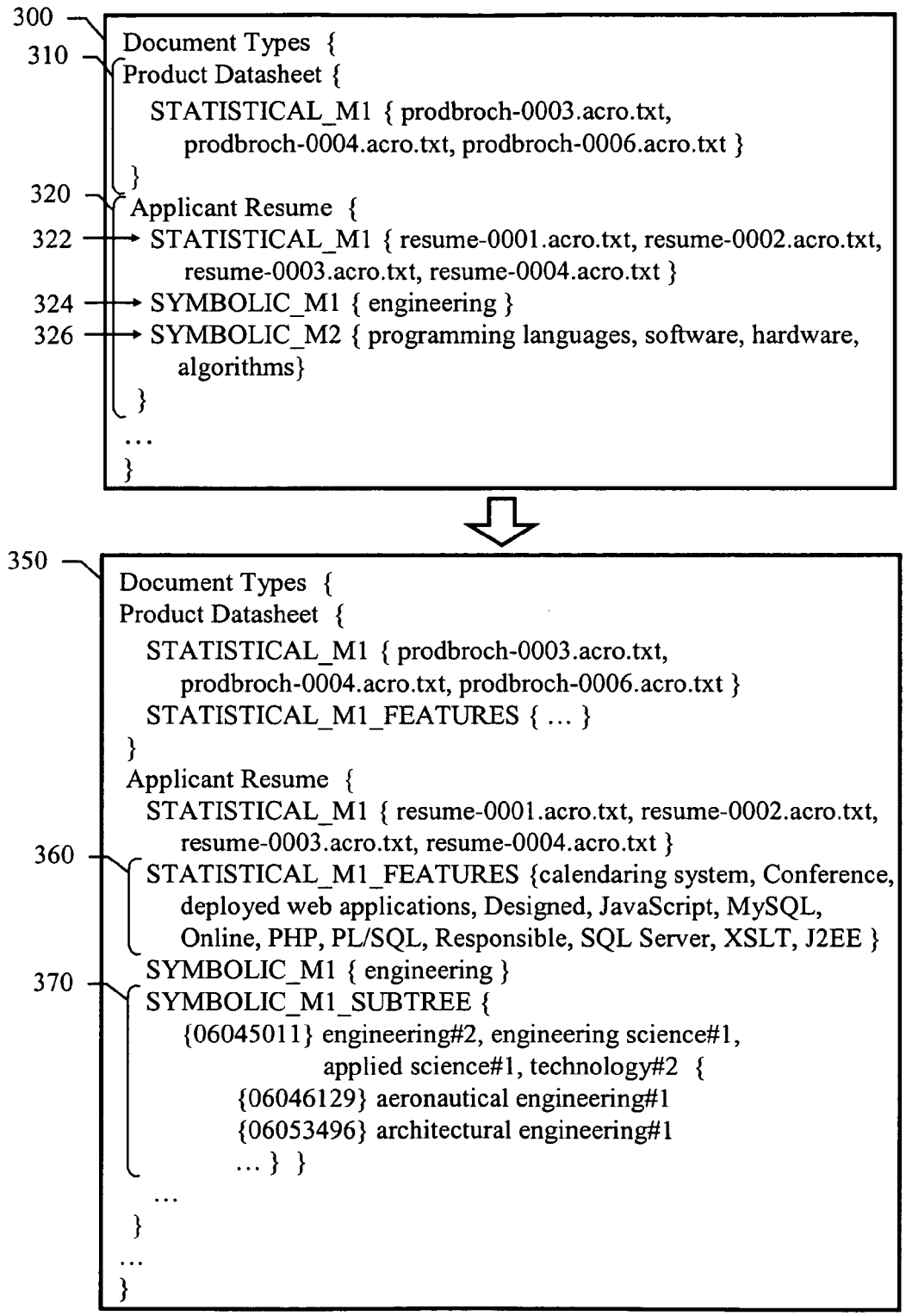
FIG. 3 shows an example seed ontology and an example populated ontology.

FIG. 3 shows an example seed ontology 300 and an example populated ontology 350. The seed ontology 300 includes both descriptive keywords and the names of documents or descriptive files which can be read by the system during the learning modes. In this example, there are two document types (initial categories) shown: Product Datasheet 310 and Applicant Resume 320. The Product Datasheet category 310 references only example documents for the category: prodbroch-0003.acro.txt, prodbroch-0004.acro.txt, and prodbroch-0006.acro.txt. The Applicant Resume category 320 references both example documents and symbolic keywords.

The Applicant Resume category 320 includes a STATISTICAL_M1 tag 322 and associated references to example documents: resume-0001.acro.txt, resume-0002.acro.txt, resume-0003.acro.txt, and resume-0004.acro.txt. The STATISTICAL_M1 tag indicates that a first statistical machine learning technique is to be used to glean knowledge for the category from the listed example documents. Additional tags can also be provided, and thus one or more statistical machine learning techniques can be used in building a single ontology 350.

The Applicant Resume category 320 also includes a SYMBOLIC_M1 tag 324 and a SYMBOLIC_M2 tag 326, and associated keywords to be used in generating symbolic knowledge subtrees from different symbolic knowledge ontologies. Thus, one or more symbolic knowledge sources can also be used in building the single ontology 350. These tags thus represent indications of the type of ontology aggregation to be performed within a given node of the ontology, and a user is free to mix and match (when constructing the seed ontology) the types of ontology augmentation to be used at each node.

This structure allows concepts to be described in multiple ways, and allows a given concept node in the ontology to include multi-faceted descriptions of the concept at hand. Once the seed ontology 300 has been processed to form the populated ontology 350, a single concept node can include a wealth of information that has been extracted from different knowledge sources using very different methods. In the given example, the Applicant Resume node 320 now includes STATISTICAL_M1_FEATURES 360, which have been derived from the sample documents using statistical machine learning, and also includes a SYMBOLIC_M1_SUBTREE 370, which has been derived from a public symbolic ontology, such as WORDNET® 2.1.

This approach allows the representation and implementation of a hybrid of different kinds of ontology augmentations using a combination of statistical and symbolic methods. Furthermore, it provides a framework for extending the augmentation to use other symbolic and statistical techniques, by simply adding more tag types and associated algorithms, for performing the augmentation. Thus, multiple aspects of domain knowledge (which are learned and recorded in multiple and varied ways) can be represented and processed in a single hierarchical knowledge structure. This structure can be viewed as a hybrid ontology structure that provides a consistent and uniform way of representing both symbolic and machine learned knowledge.

It should be appreciated that the example ontologies shown in FIG. 3 are only portions of the whole. In typical applications, the seed ontology 300 will be larger than that shown, and the populated ontology 350 will be much larger than that shown. In addition, the populated ontology 350 can include additional information useful for diagnostic or archival purposes, such as build parameters used for both the machine learning and symbolic knowledge building processes, and output measurements from the machine learning. Information included in the constructed ontology can include the number of best features found by information gain, the number of features per category, and values for user controllable training parameters; a detailed example of such is provided in the technical appendix. Moreover, the machine learning and symbolic ontology building methods used by the system can be known methods, or the new methods described herein.

Figure 4:
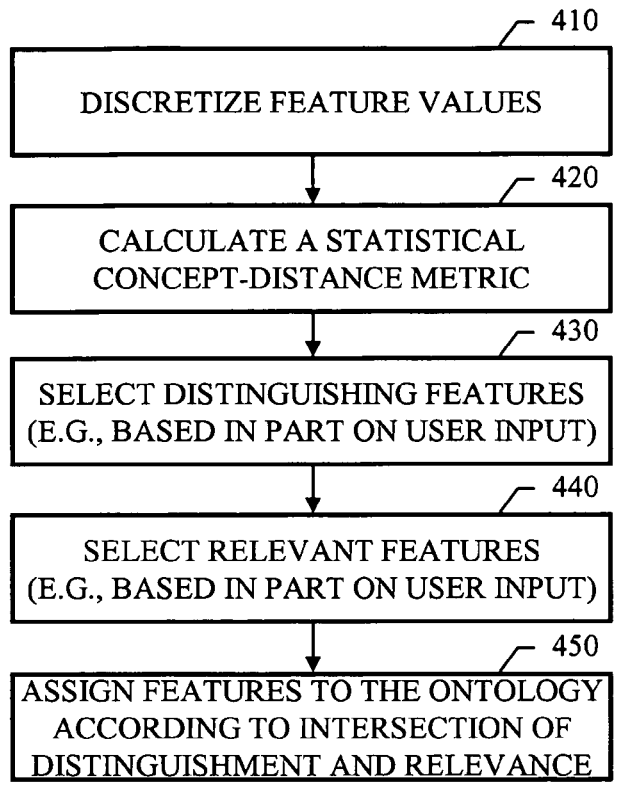
FIG. 4 is a flowchart showing an example process of determining new features for an ontology from sample documents using statistical machine learning.

FIG. 4 is a flowchart showing an example process of determining new features for an ontology from sample documents using statistical machine learning. Initially, feature values can be discretized at 410. Frequency values for the extracted features can be calculated and stored in a features database along with the features. For a given feature (word or phrase), the corresponding frequency values specify how often the given feature occurs across a corpus (a set of documents). For example, a term may occur with frequency 0.3 in one group of one or more documents, and frequency 0.7 in another group of one or more documents.

These frequency values can be retrieved, along with the features, and then grouped into value-range buckets to decrease the number of discrete frequency values. This process is also referred to herein as attribute discretization or attribute hash. In general, discretization is the process of mapping an array of number (often including duplicates) to a discrete set of values or ranges. Thus, numbers that are close enough to be considered identical can be treated as being identical: given a set of k numbers in increasing order, $n_1, \ldots, n_k$, discretization involves identifying m values $r_1, \ldots, r_m$ in increasing order that correspond to adjacent intervals $[r_1, r_2)[r_2, r_3), \ldots, [r_{m-1}, r_m)$ such that each $n_i$ falls into an interval. Moreover, the discretization of feature values at 410 can be based on a statistical variance of the values and a user-controllable variable that affects the number of buckets used for a particular ontology (e.g., based on the Attribute-Hash parameter described below).

A statistical concept-distance metric can be calculated at 420, using the discretized values as input, to produce a score and ranking for candidate feature values to be included in the ontology. The statistical concept-distance metric can be a traditional metric such as information gain, mutual information, or chi squared. Alternatively, the statistical concept-distance metric can be a modified version of information gain, as is described below.

The most distinguishing features can be selected at 430 based on the calculated statistical concept-distance metric and a user-controllable input. Selecting distinguishing features is important since proper selection of these features can significantly help differentiate which categories a new unknown document should be categorized under. The most relevant (significant) features can be selected at 440 based on a user-controllable input, and features can be assigned to the ontology at 450 according to the intersection of the distinguishing features and the relevant features (note that the identification and selection of most relevant features can be performed in parallel with the identification and selection of most distinguishing features). Detailed examples of these operations are now described, including the modified version of information gain.

Information gain is a function that exploits the groupings of documents under different nodes in a seeded ontology. A vocabulary is built, where the vocabulary includes all terms (words or phrases) in the documents (excepting any stoplisted words, and potentially using word truncation and stemming). Documents that are used to describe different nodes (which represent distinct categories) are considered to be in distinct groups (a group of training documents for a given category). In the example discussed above in connection with FIG. 3, there are two categories: Applicant Resumes and Product Datasheets. The vocabulary is the set of terms that occur in the corresponding documents of the categories (e.g., the set of words found in the documents prodbroch-0003.acro.txt, prodbroch-0004.acro.txt, prodbroch-0006.acro.txt, resume-0001.acro.txt, resume-0002.acro.txt, resume-0003.acro.txt, and resume-0004.acro.txt).

Information gain can be used to produce a ranking of the vocabulary terms, where the highest ranked terms are most distinguishing between the various groups. In other words, a term is ranked high if knowing its relevance (or frequency) within a document can help identify the appropriate group for the document, with a certain degree of confidence. For instance, the term "experience" may not occur in a product datasheet at all, but may occur frequently in applicant resumes. Lower ranked terms may occur in multiple groups with equal probability (such as the term "Java") or may occur in one group very infrequently (e.g., a specific person's name may be in only one resume).

Documents can be represented as a set of features, where a feature corresponds to a term and that term's frequency within the document. Across a corpus (the set of documents forming the training sets for the various categories), the same term may occur with varying frequency in different groups. For instance, a term may occur with frequency of 0.3 in one group, and 0.7 in another. Similarly, another term might occur with frequency 0.35 in one group, and frequency 0.36 in another.

The information gain computation can be as follows:

Given:

A set of documents S

An attribute (word or term) A

A set of values $V_A$ of A consisting of the distinct values of A for all documents in S A partition $S_{A=v}$ of S based on $V_A$.

Information Gain (IG) of A:

$$IG(A) = H(S) - \sum_{v \in V_A} \frac{|S^{A=v}|}{|S|} H(S^{A=v})$$

H(S) is the entropy of set S

IG(A) is maximum when feature occurs with distinct v, for each class

IG(A) is minimum when feature has same value for all classes

Furthermore, in the equation above, the entropy function H(S) can be defined as follows:

Given:

Set of classes (categories) C

Distribution over categories pc=|Sc|/|S|, probability of class c in S, (where |S| is the number of document-category relationships in S, and |Sc| is the number of documents that belong to category c).

Entropy:

$$H(S) = -\sum_{c \in C} p_c \log p_c$$

Key ideas:

H(S) is minimum (0) when all documents are in one class

H(S) is maximum when all classes are equally likely

Traditional information gain techniques typically identify the terms that render the greatest reduction in entropy. This is usually accomplished by using the term's frequency across a corpus, and identifying how well the frequency (the associated feature value) identifies the category. However, in typical corpora, attributes that are otherwise informative, may occur often in one (or few) categories but not at all in most other categories. In other words, the term helps to distinguish sub-groups of categories from the remaining categories.

Unfortunately the term has lower information gain if there are too many categories in which the term does not occur, because knowing that the term is absent does not readily help in identify the groups with which the term is associated. This behavior is generally acceptable in traditional machine learning approaches that rely on feature selection, but this behavior may not be ideal for populating an ontology with sub-concepts because this approach may filter out sub concepts that are relevant and important. To overcome this, when computing the information gain of a term t, the present techniques can involve computing and taking only a fraction of the entropy of the set of documents for which t is absent. The modified function can be understood as a Smoothed Zero-Value Information Gain (SZVIG) and can be defined by the following equation:

$$SZVIG(A) = H(S) - \frac{1}{C} \cdot \frac{|S^{A=0}|}{|S|} H(S^{A=0}) - \sum_{v \in V_A, v \neq 0} \frac{|S^{A=v}|}{|S|} H(S^{A=v}), \quad (1)$$

SZVIG can provide significant advantages when populating an ontology with key terms.

The information gain of an attribute can be significantly affected by the distribution of values in $V_A$. As addressed above, documents can be represented as frequency feature vectors: vectors of features and their frequency in the document. The frequency distribution can form natural clusters of individual frequencies, for which two frequencies in one cluster can be considered the same (such as the occurrence of the term "software" with frequencies of 0.35 and 0.36 in two document groups, respectively).

To assist in identifying meaningful clusters of term values across a corpus, various term value discretization techniques can be used. These techniques can be controlled by parameters that can be adjusted by a user. Moreover, the selections of these parameters can depend on computed statistical characteristics of the clusters of attribute values. For example, one important characteristic of the cluster can be the variance of values within a cluster.

The attribute discretization technique can have a significant impact on the final results, because the discretization determines what difference in attribute value is significant enough to be considered informative. In other words, if the discretization is too selective, then the two term frequencies of 0.35 and 0.36 in two different document groups may be considered distinct, and therefore the term would be more likely considered informative because knowing its frequency in a new document would indicate which group the new document belongs to. In some implementations, the following parameter, AttributeHash, can be used to control the attribute discretization behavior.

The AttributeHash parameter can be used to control the degree of granularity of the feature value-discretization that takes place in computation of the information gain of a feature. The AttributeHash parameter can control the degree to which two different feature values are considered the same. For a given feature A in the vocabulary, each document x has an associated value $f_A(x)$ (in this case, the frequency of A). The discretization of the attribute values of A can depend on the variance of $f_A(x)$ across all documents x in the corpus, together with the AttributeHash parameter value v, which can be supplied by the user.

For each attribute A, the attribute values $f_A(x)$ can be sorted and subsequently grouped by variance. The maximum variance of each group is a function of the variance across the corpus:

$$\frac{1}{v} \sum_{x \in S} (f_A(x) - \bar{f}_A)^2, \quad (2)$$

where $\bar{f}_A$ is the average across all documents x:

$$\bar{f}_A = \frac{1}{|S|} \sum_{x \in S} f_A(x). \quad (3)$$

Variants of this methodology can include an approach which uses log(|S|) instead of v. The AttributeHash parameter can provide improved performance over prior approaches, in particular, when combined with the feature selection and assignment as described herein.

The information gain (IG) function (e.g., SZVIG as described above) can produce a ranking of the vocabulary terms, ranked by their ability to distinguish between categories. The machine learning process that augments (or aggregates) the ontology with new concepts (in this case, vocabulary features) can select the features with the highest information gain value—that is, those ranking above some cutoff. This cutoff can be selected in various ways, and the cutoff can be partly controlled by a parameter called the Overall parameter, which is described further below.

For a node that is associated with a set of training documents, subsets of the collection of most distinguishing overall terms can be selected to associate with the node. The decision about which vocabulary terms to use in this augmentation can depend on the value of the term to the associated group of documents (represented by the frequency), and on a third tuning parameter, referred to as the BestFeatures parameter. This tuning parameter can be used to select the set of terms that are most relevant to the group of documents at hand, and the relevance can be determined by the object feature vector. Note that the use of the term "BestFeatures" and the phrase "best overall features" herein does not imply that these features are the best possible in some absolute sense.

A term is relevant if it occurs frequently in the set of documents. The term can be included as a sub-concept of the document-seeded concept at hand if the term is among the concept's most relevant terms, AND the term is among the most distinguishing overall terms. For example, if the terms "education" and "platform" are terms selected as most distinguishing overall terms, then those terms that have high relevance to the Product Datasheet category, e.g., "platform", can be added as a sub-concept of Product Datasheet. In contrast, the term "education" may have low value to the Product Datasheet category, and in such case would not become a sub-concept.

In general, the behavior and quality of results for a data-driven machine learning method of building an ontology depends on the characteristics of the data, such as the relative number of terms in documents and the degree of overlap between document groups. By providing the three primary parameters described (AttributeHash, Overall, and BestFeatures), the behavior of the statistical machine learning portion of the ontology aggregation process can be readily controlled, and the quality of the results can be significantly improved. These three parameters can be user-controllable and can also have default settings. The statistical ontology aggregation process is now described in detail in connection with these three parameters.

Figure 5:
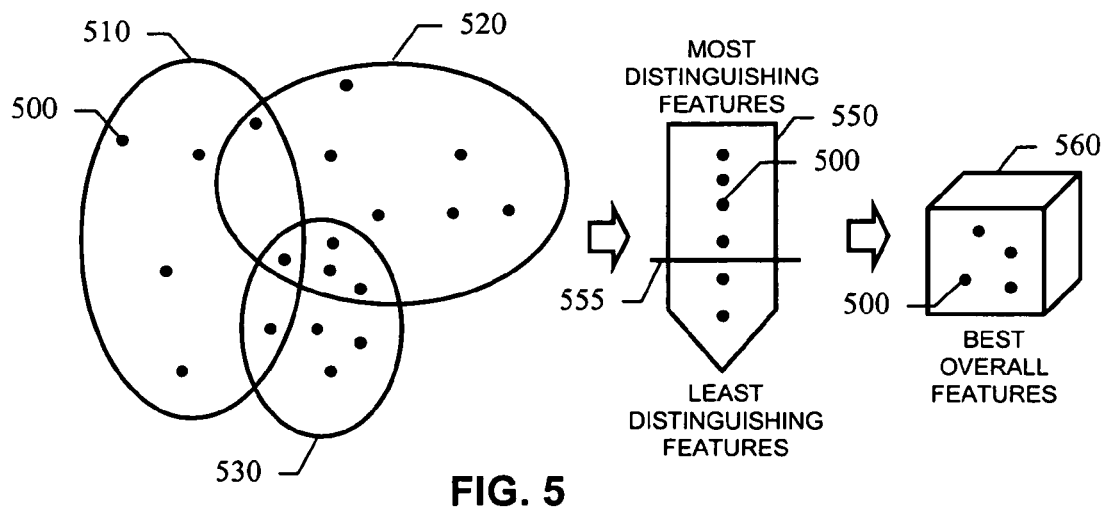
FIG. 5 is a block diagram showing an example process of selecting features to use in augmenting an ontology.

FIG. 5 is a block diagram showing an example process of selecting features to use in augmenting an ontology. A seed ontology includes different categories with associated groups of documents 510, 520 and 530. The black dots represent features, e.g., a feature 500, that have been pulled from these documents, and are then ranked 550 according to how distinguishing the features are with respect to the categories. In general, features that occur in all three categories are less distinguishing than features that occur in only one category, and features from different document groups 510, 520 and 530 are ranked by the reduction in uncertainty that the features contribute to the classifications corresponding to those document groups (e.g., ranked by the information gain metric described).

The features can also be ranked by their value to the category (or categories) in which they are found. Those features that are valuable to their category, and also are among the most distinguishing features (e.g., as determined by a threshold 555), represent the best overall features 560. These features can then be used for ontology augmentation.

As discussed above, the computation of information gain can involve feature value discretization, and this discretization can employ varying degrees of granularity using the AttributeHash parameter. An attribute may be associated with many different values across a corpus of documents; the word "Java" may occur with frequency 0.070 in one document and 0.065 in another, and 0.030 in a third. The AttributeHash parameter influences the number of different values that an attribute can actually take on in a corpus, by influencing the number of buckets into which the attribute values can be placed. Thus, the AttributeHash parameter can control the degree to which two different feature values are considered the same for purposes of computing the information gain. In the above example, a low AttributeHash may take the values 0.070 and 0.065 to be the same, whereas a higher AttributeHash may take these values to be different. The shrinkage in the number of value buckets can be controlled according to equation (2), which can be pictorially understood as follows.

Figure 6A:
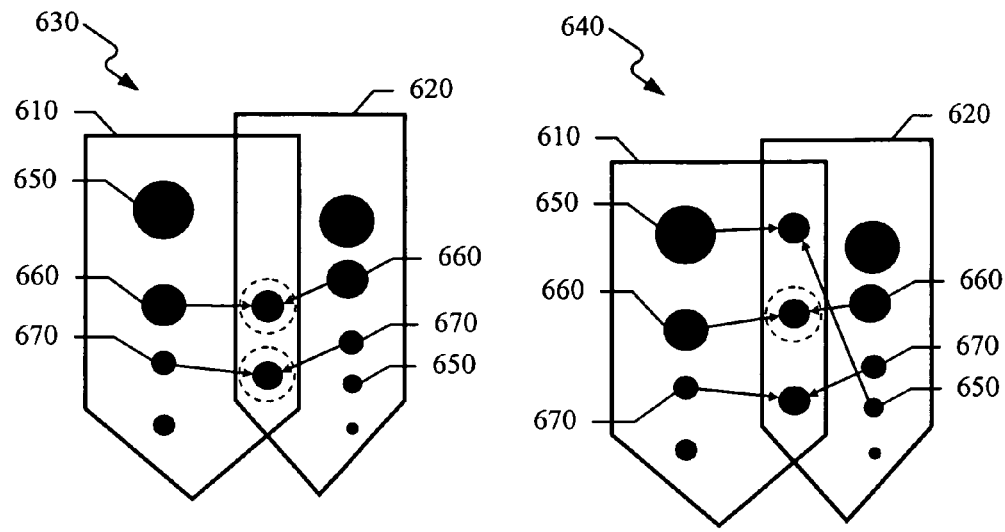
FIG. 6A shows a comparison of different attribute value discretizations.

FIG. 6 shows a comparison of different attribute value discretizations. Two different groups of documents 610 and 620 are shown with respect to two cases: a low AttributeHash 630 and a high AttributeHash 640. As before, the dots represent features in the vocabulary, but in this case, the size of the dots corresponds to the value in the feature vector (e.g., the frequency) for the corresponding feature. The dots in the overlapping regions of the document groups 610 and 620 indicate that the vocabulary feature has a non-zero zero value in both of the two document groups. With the low AttributeHash 630, features generally take on a smaller set of values across documents; and with the high AttributeHash 640, features generally take on a larger set of values across documents.

In the low AttributeHash 630, two features 660 and 670 are considered to be close enough as to have the same value, with respect to information gain (represented by dashed circles). A third feature 650 has been discretized to a value of zero in the document group 620, and thus this feature 650 does not appear in the overlap region. In the high AttributeHash 640, features that are close in size are more likely to be considered different. In this case, the feature 660 is considered to have the same value in the two document groups 610 and 620, but the features 650 and 670 are not. Thus increasing the value of the AttributeHash parameter causes the creation of more buckets into which attribute values are placed, with less difference between values in different buckets, and decreasing the value of the AttributeHash parameter causes the creation of fewer buckets, eventually causing information gain to interpret feature vectors as if they are binary-valued.

In general, when the feature overlap between groups of documents (which can be understood as noise in the training sets) is minimal, the AttributeHash should be set to a lower value so that the few features that do occur in multiple document groups will correspond to feature values that belong to the same group; thus the word will be considered less informative. Otherwise, the AttributeHash can be set higher so that knowing the value of a word on a document will help to identify the document class. Additionally, if one category has significantly more vocabulary words than another (such as with a large collection of full news articles verses a smaller collection of just headlines), then the AttributeHash parameter value should be set higher. Typical values for the AttributeHash parameter can be in the range of 3 to 10, and the default value can be 3.

Figure 6B:
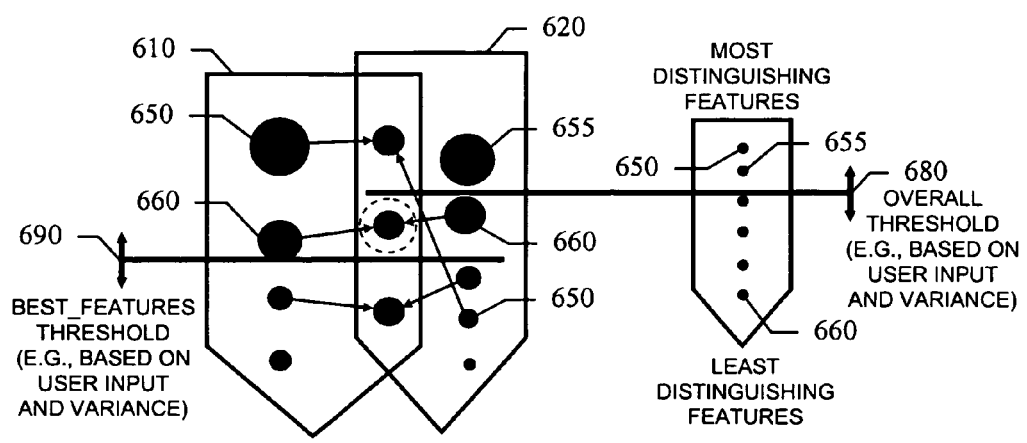
FIG. 6B shows attribute value discretizations in combination with thresholds used to determine the best overall features.

FIG. 6B shows attribute value discretizations in combination with thresholds used to determine the best overall features. While the output of the information gain function can be directly influenced by the AttributeHash parameter, the Overall parameter governs the set of overall most distinguishing terms that information gain retrieves by controlling a threshold 680 at which a vocabulary feature is considered sufficiently informative. The options for the Overall parameter can include a variance setting and a proportion setting. The variance setting affects the number of features selected based on the variance of the information gain rankings, and the proportion setting affects the number of features selected based on the total number of features ranked.

As shown in FIG. 6B, the feature 650 (which the AttributeHash placed into discrete buckets for the two document groups 610 and 620) has a high information gain. Knowing the value of the feature 650 reduces the total entropy (thus increasing information gain) since the feature occurs with a different value in the two groups 610 and 620. The feature 660 has low information gain because the AttributeHash caused the information gain function to treat the two frequencies of the attribute as the same value in the two groups 610 and 620. Thus, knowing the attribute value does not provide a gain in information.

As mentioned above, variance and proportion are different heuristics that can be used for setting the Overall threshold 680. The variance option for the Overall parameter can involve computing the variance over all of the information gain values and selecting the top most informative features having some limited variance. For example, the variance setting for the Overall parameter can be computed according to the following equation:

$$\frac{1}{g} \sum_{A \in V} (SZVIG(A) - \overline{SZVIG})^2, \quad (4)$$

where V is the vocabulary, g is the parameter value for the Overall parameter (which can be provided by the user), and $\overline{SZVIG}$ is the average Smoothed Zero-Value Information Gain across all vocabulary terms. The variance setting may be recommended if more sparse ontologies are desired, or for ontologies which are generated depending on data. For experimentation, starting with the variance setting may be preferable. Selecting lower values for g will lower the threshold 680 of distinguish ability. Settings for g can be between 2 and 5.

The proportion setting for the Overall parameter allows the user greater control over the set of best features selected by selecting a proportion of features. That is, if the user supplies a proportion such as 0.5, then the 50% of vocabulary words that have the highest information gain are selected as the set of best overall features. This setting for the Overall parameter can provide more flexibility, and the default setting can be a proportion of 0.1.

Typical values for the proportion setting of the Overall parameter can be in the range of 0.05 to 0.40 for large, noisy corpora, such as with corpora of research papers or news articles, and higher for smaller or less noisy corpora. A generally optimal setting for this parameter, for a given data set, can produce an ontology that is as dense as possible, with minimal shared child nodes across categories. Decreasing the proportion reduces the number of features that are considered distinguishing, and is recommended if there is a large disparity between the number of features in different classes, or if the distinguishing features are likely to be spurious. The proportion should be increased if a more connected graph with more shared descendent nodes is desired.

Given a node and a vocabulary, the BestFeatures parameter governs the set of features that are considered most valuable, where the "value" of a feature is the value in the feature vector (e.g., the frequency of the feature in the set of documents). This ranking can be completely independent of the AttributeHash and Overall parameters. However, in a way much like that of the Overall parameter, the BestFeatures parameter governs a threshold 690, and features whose value is above the threshold are considered to be semantically valuable to the ontology node at hand and are considered for aggregation.

The BestFeatures parameter can also have variance and proportion settings. In the case of the variance setting for the BestFeatures parameter, the discretization of features values can use the variance of the feature vector values, and the terms that are in the highest rank groups can then be selected. The variance setting for the BestFeatures parameter can be a nonnegative integer, where larger values cause fewer terms to be used. The variance can be defined as follows:

$$\frac{1}{V} \sum_{A \in V_c} (f_A - \overline{f})^2, \quad (5)$$

where $V_c$ is the collection of all vocabulary features occurring in all documents of category c, $f_A$ is the average frequency of feature A in all documents of category c, and $\overline{f}$ is the average across all vocabulary terms A:

$$f_A = \frac{1}{|S_c|} \sum_{x \in S_c} f_A(x), \quad (6)$$

$$\overline{f} = \frac{1}{|V_c|} \sum_{A \in V_c} f_A. \quad (7)$$

The proportion setting for the BestFeatures parameter can be used to control the proportion of the number of terms that are selected (the highest ranked terms). If this setting is 0.3, then 30% of the features are considered "best". Use of the proportion setting for the BestFeatures parameter can allow greater control over the features that are used to populate the ontology. Note that this is different from distinguishability since a feature can be relevant but have the same relevance in all categories, and conversely, a feature can be distinguishing in general, but relevant to a specific category far more than other categories.

In the context of FIG. 6B, increasing the proportion setting for the BestFeatures parameter lowers the threshold 690, and thus increases the number of features that are considered valuable. The proportion is maximal when all of the features are considered valuable enough to include in the ontology, and in such case, the inclusion of features in the ontology then depends entirely on the selectivity of the Overall parameter (subject to the AttributeHash parameter). Recommended settings for the proportion setting for the BestFeatures parameter are between 0.25 and 0.60. Lower values are recommended for more sparse ontologies, or for when there is more spurious data, while higher values are better suited for ontologies which have less noisy data.

FIG. 6B depicts the interplay between the three parameters: AttributeHash, Overall, and BestFeatures. The two features 650 and 655 are selected as new nodes in the ontology. Both are above the information gain threshold 680, as set by the Overall parameter, and both are above the feature significance threshold 690, as set by the BestFeatures parameter.

Two additional parameters can also be used to constrain the features selected by limiting the proportion of overall features that can be associated with a node, or limiting the number of features to associate with a node. The latter parameter setting, if low enough, allows all categories to be treated equally regardless of the number of terms and number of documents. The former achieves a similar result, but depends on the vocabulary size.

Note that the proportion and variance settings described above for the Overall and BestFeatures parameters can be used in various combinations, either within a given implementation, or with different implementations of the described systems and techniques. In addition, it should be noted that explicit discretization in order to facilitate selection of features has been used previously to facilitate naïve Bayes and decision tree learning classifiers.

The above described techniques for aggregating an ontology can also be understood in the context of the following pseudo code:

input: a seed ontology, represented as a DAG, having some initial structure,
   where nodes can be plain, described by keywords, or described by documents.
   A1. Traverse the tree. At each node:
   A1a) if the node is described by a list of documents, fetch the documents from the database.
   A1b) if the node is described by a set of keywords for use in symbolic augmentation,
      i. mine the symbolic ontology (e.g., an English comprehensive ontology, such as WORDNET®) using those keywords
      ii. use heuristics to determine which results to include in the augmented ontology
         these heuristics can be user controllable, such as fetching the "instance of" subtree or just the "instance of" children, fetching the "part of" subtree, and/or using other keywords to help disambiguate the sense if no sense was provided
      iii. bind the fetched DAG to the ontology node.
   A2. For each node _N having children that are described by a set of documents,
   A2a) create a group of documents for each child node.
      All documents in a group are documents that can be reached by following nodes connected to the given child node, e.g., there may be several types of Product Datasheets, but all are used to describe the Product Datasheet group.
   A2b) compute, for each vocabulary term t, the information gain IG(t) over this set of document groupings.
      Use the attribute discretization parameter AttributeHash (described above).
      IG gives rise to a ranking for all terms in the vocabulary.
   A2c) use the Overall selection parameter that has been set by the user
      (or the default value) to select the highest ranked vocabulary terms (see above). This produces the set of most distinguishing terms, called _MostDistinguishing.
   A2d) for each child node, _CHILD, of _N, given _MostDistinguishing
      i) let _D be the documents, represented as feature vectors, that describe _CHILD
      ii) compute the averaged feature vector over _D, _AverageFV
      iii) select highest ranked features in _AverageFV using the BestFeatures parameter (see above)
      iv) from these highest ranked features, choose the ones that are also in _MostDistinguishing, and use these in the _TermSelection
      v) the _TermSelection is now a collection of most distinguishing terms that are also most relevant to CHILD. A new child node, _IG, signifying this information theoretic facet of ontology augmentation becomes a new child of _CHILD, and all of the terms in _TermSelection correspond to child nodes of _IG.

Furthermore, the attribute discretization described above can be global and unsupervised. This attribute discretization can be influenced by an input-controlled factor and be based on the statistical variance of attributes, such as described above. This attribute discretization can be called Discretization Variance (DVar) and can also be understood in the context of the following pseudo code:

Given: an array of ordered values of real numbers, and a factor $f$.
   A) Calculate the variance of the array v.
   B) Let m=v/$f$. This is the maximum variance of any group.
   C) Invoke the computation on the array, given the maximum variance:
      1. Compute the mean of the values.
      2. Compute the variance of the values. If the variance is less than the maximum,
      3. note the lowest value of the numbers and return.
      4. Otherwise, cut the array into two sections based on the mean.
      5. Recursively perform step C on each of the two sections.

This approach can have the following noteworthy properties. The variance of any portion of the array cannot be larger than the variance of the entire array. In general, this is because the values in that portion of the array must be at least as close to the average of their values as they are to the average of the entire array. Therefore the variance of a subgroup of items within a group of items is an effective way of measuring how relatively close the items are. Moreover, a simple extension of this approach can factor in the number of attributes to be discretized as well, by taking as a factor f some reducing function of the number of attributes k (such as ln(k), sqrt(k), etc.). The ontology builder can implement this as an option as well.

DVar can map a continuous-valued finite set of numbers into a finite set of intervals. In contrast with many prior discretization approaches, DVar can discretize attribute values independent of any class memberships of those values. Moreover, DVar makes use of variance in discretization, and the granularity of discretization in DVar can be influenced or controlled by an input parameter.

Implementations of the present systems and techniques can employ a directed acyclic graph (DAG) to represent a generated ontology. Moreover, a DAG can be stored in a relational database in a manner now described, which can, in general, allow applications that employ hierarchical knowledge structures to efficiently represent, search and retrieve DAGs. The following DAG representation systems and techniques can provide significant performance improvements during knowledge retrieval and querying functions, and can have direct application to large Bayesian Belief Networks by providing a means to efficiently locate dependent evidence nodes for computing the conditional probability of any particular event node in the network. The DAG representation systems and techniques now described are the subject of another patent application, U.S. Patent Application No. 60/778,869, entitled "SYSTEM AND METHOD OF EFFICIENTLY REPRESENTING AND SEARCHING DIRECTED ACYCLIC GRAPH STRUCTURES IN DATABASES", which was filed on Mar. 3, 2006 (hereinafter referred to as the "DAG application").

While semantic network DAGs can provide a general framework for representing knowledge, performing machine reasoning and inferencing, they are often inefficient when these structures are large. The DAG application can overcome several efficiency problems inherent to the other approaches. For example, the DAG application can allow inference chains in the knowledge structure to be quickly located, materialized and followed for machine reasoning applications; can allow DAG sub-structures such as a topic sub-ontology to be quickly retrieved; and the DAG application can provide a mechanism for logically and physically sharing knowledge node values within an ontology DAG and across ontology DAGs.

A traditional method for representing trees and DAGs in a database involves the use of Adjacency Lists. Adjacency Lists typically require navigation of the stored DAG structure and are frequently inefficient for larger graphs. The use of Materialized Paths is also a known idea for representing and searching tree data structures in a database. For DAGs, this technique can also be used but without the indirection mechanism described in the DAG application; significantly, storage is required for node values within each path list. This method is typically not used due to inefficiency of string operations required to search and locate node data values.

Interval encoding methods have also been used but are generally restricted to strict tree structures. Furthermore, interval encoding methods can have drawbacks in that for normal node insertion operations, a large subset of the records that contain interval values are typically accessed and updated. In worst case update scenarios that result from common node insertion operations, up to half of the total interval values may have to be accessed and updated. The DAG application need not suffer from this problem and may require at most M rows to be added to the DAG Path table (described below) where M is the total number of new paths formed by the addition of the new node to the DAG.

Fractional methods such as Farey Fractions can suffer from having to perform a large number of arithmetic operations on a potentially large subset of nodes within the DAG. In the case of Continued Fractions, problems will often begin to be encountered due to limitations with the numeric precision used to represent the range. These algorithms can run out of precision at around four levels in the DAG, which is typically insufficient for most large knowledge structures which often may be dozens of levels deep.

Particular embodiments of the DAG application can be implemented to realize one or more of the following advantages. DAGs can be efficiently represented in relational databases, and subsets of DAGs represented in this manner can be efficiently retrieved. Sub-areas of knowledge structures stored using the DAG application can be readily located and accessed, and rapid inferencing can be realized using the DAG application.

The following description of the DAG application addresses four major elements, the algorithms used to insert and delete nodes from the DAG, and how the logical and physical data value sharing mechanism works, which can allow symbolic knowledge to be shared both within a single ontology and across different ontologies. The four major elements are as follows: (1) a DAG-PATH table used to enumerate all possible paths form the root node to each node in the DAG; (2) an indexing technique used to rapidly locate any DAG node in the DAG and all relevant paths that the node participates in, which can allow inference chains to be quickly followed and materialized; (3) a common knowledge operation involving the retrieval and materialization of a sub-DAG of the knowledge structure, where the path entries can be used to rapidly fetch a sub-DAG; and (4) an indirection mechanism that allows DAG node data values to be shared within a DAG, and in addition, Data Values can also be shared across different DAGs via the Data Value nodes.

Figure 7A:
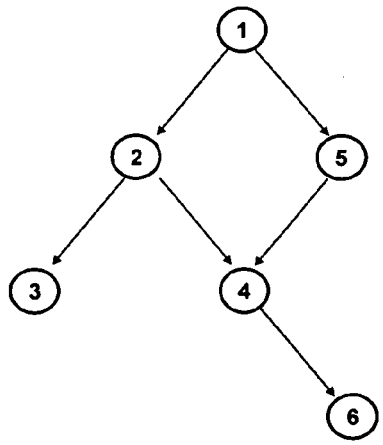
FIG. 7A shows an example initial directed acyclic graph (DAG) structure.
Figure 7B:
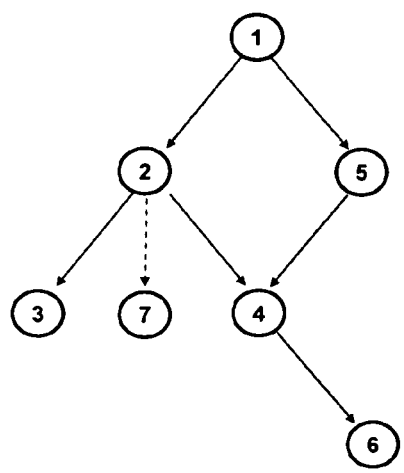
FIG. 7B shows an example of adding a new node and path to the DAG structure of FIG. 7A.
Figure 7C:
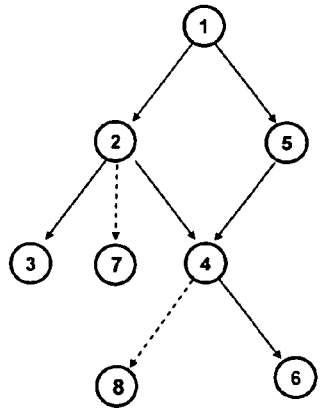
FIG. 7C shows an example effect of adding a second new node to the DAG structure of FIG. 7B, and the resulting paths.
Figure 7D:
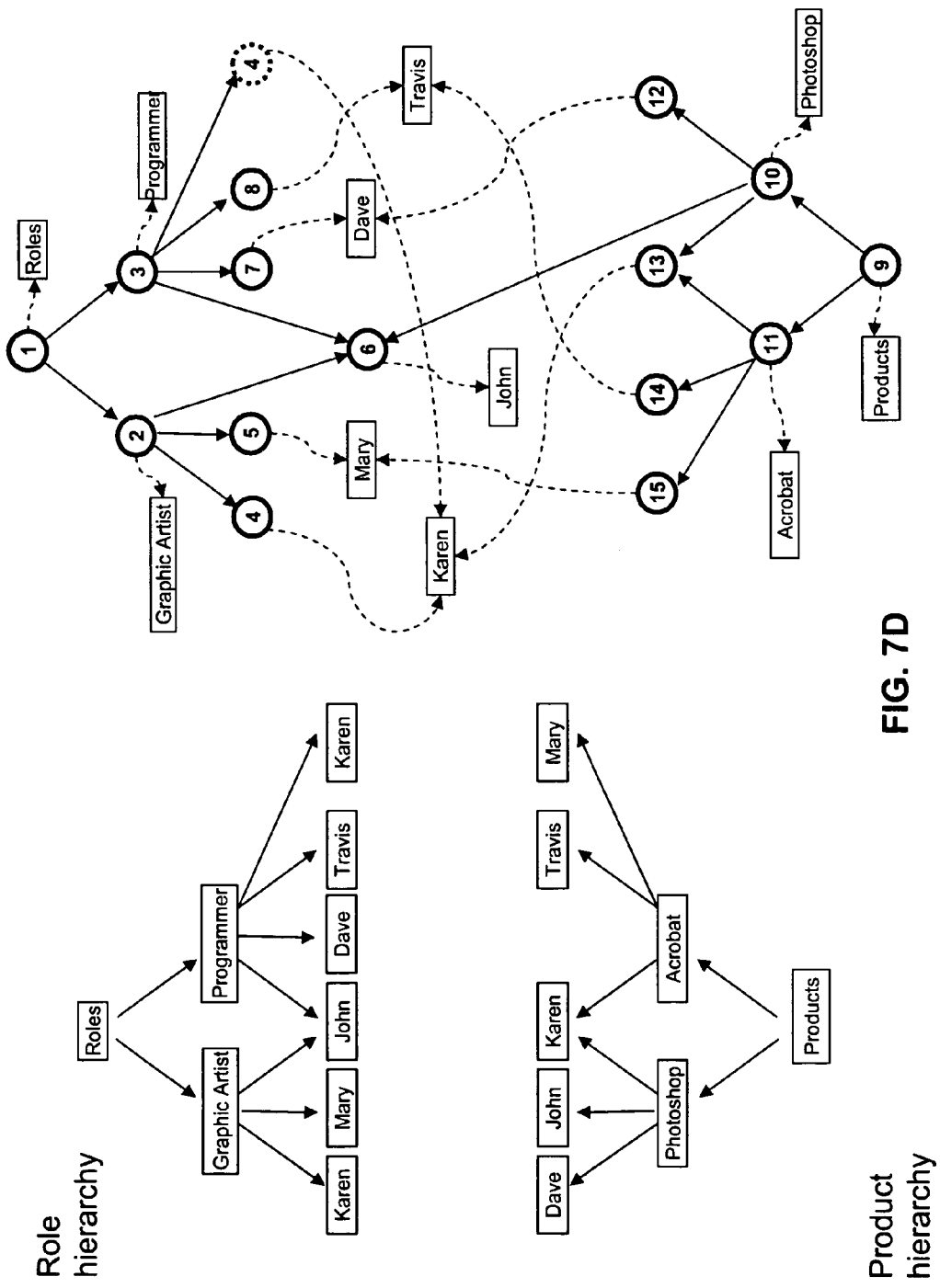
FIG. 7D shows example DAG taxonomy structures with shared data nodes.

FIG. 7A shows an example initial DAG structure. FIG. 7B shows an example of adding a new node and path to the DAG structure of FIG. 7A. FIG. 7C shows an example effect of adding a second new node to the DAG structure of FIG. 7B, and the resulting paths. FIG. 7D shows example DAG taxonomy structures with shared data nodes. For the purposes of explanation, in FIGS. 7A-7C, data node value sharing is not initially addressed. Subsequently, and in FIG. 7D, data node sharing is shown and described. A node indicated by a circle is a DAG Node, i.e., these nodes are used to form the DAG structure. A separate type of Data Node can be used to contain data values and is discussed in connection with FIG. 7D.

The basic operations used in include inserting, deleting, and fetching nodes from the DAG structure and updating the DAG Path table to reflect these operations. The operations on the DAG can be expressed by using a combination of the primitives A-H defined below:

A. Find all paths from any Node to the Root node:
Find all paths having a specific Node as a leaf.

B. Find the sub-DAG rooted at a Node:
Find all paths that a Node participates in excluding the paths for which Node is a leaf. The irrelevant portions of the sub-DAG are prefixes of the path strings that occur before the specific Node.

C. Find all directed paths between Node A and Node B:
Find all paths having both A and B in any order, having one of them as a leaf.

D. Find all minimum length undirected paths between Node A and Node B:
  1. Find all directed paths between Node A and Node B, call this set Pi.
  2. Find all paths Pa from Node A to the Root Node, but not having Node B. Find all paths Pb from B to the Root Node, but not having Node A. Take the cross product of these two sets:

$P=Pa \times Pb$ for each pair in the cross product P, if the length of the shortest common prefix on the path is k, remove the first k−1 nodes from each of the two paths. This gives two paths that, when joined by their single common leftmost node, form an undirected path between A and B.
  3. The union of P and Pi together represent all undirected paths between Node A and Node B.

Insertion of nodes into the DAG involves the following primitives E and F:

E. Insert a new Node into the DAG. When a new node is added, the following algorithm can be used:
  Case 1: Node is to be a root.
    1. Record the node data if it does not exist.
    2. Create a DAG node N that references the new node.
    3. Insert the new path including the DAG node, and an identifier for the leaf node N of the path.

Case 2: Node is to be a child of some other node O.
1. Record the node data if it does not exist.
2. Create a DAG node N that references the new node.
3. Find all paths that have O as a leaf node. Call these paths Po. Let Pn be the set consisting of the path having just node N. Connect all paths in Po to all paths in Pn by the cross product of Po and Pn:

Po×Pn

F. Insert a new Edge into the DAG having source Node SRC and destination Node DST. When a new edge is added, the following algorithm can be used:
1. Find all paths for which the SRC Node is a leaf. Call these paths Pi
2. Find all distinct paths for which DST Node is a Root Node. Call these paths Pj.
3. Connect all paths in Pi to all paths in Pj by the cross product of Pi and Pj:

Pi×Pj

As shown in FIG. 7A, given a knowledge DAG with nodes (1), (2), (3), (4), (5), (6), connected as shown, the DAG Path table is as shown in FIG. 7A. As each node is added, the DAG Path Table lists all possible paths to each node (indicated as a Leaf node using LeafID). E.g., for Node (6), all possible paths are enumerated: (1) (2) (4) (6) and a second path: (1) (5) (4) (6). As shown in the example of FIG. 7B, a new Node (7) is to be added to the DAG. The addition of this node results in exactly one new DAG Path entry: (1) (2) (7). Finally, FIG. 7C shows an example of how multiple DAG Path entries are created. Here a new Node (8) is added. All possible paths to Node (8) are indicated: (1) (2) (4) (8) and the second path (1) (5) (4) (8).

Deletion of nodes from the DAG involves the following primitives G and H:
G. Delete a Node from the DAG. When an existing node is deleted, the following algorithm can be used:
1. Locate all paths that the node is on.
2. Delete those paths.

Note that this deletes all nodes which do not have ancestors other than Node.

H. Delete an Edge from the DAG. When an existing edge is deleted,
1. Locate all paths that the Edge is on.
2. Delete those paths.

Note that if DST has no other parent besides SRC where SRC and DST are the source and destination of Edge (respectively), then this operation is equivalent to deleting DST.

Data node value sharing: In the description above, Node(4) has two parent DAG nodes (Node(2) and Node(3)). The concept associated with Node(4) is physically and logically shared by it's parent nodes. Node sharing is important in semantic networks; when changes are made to the concept associated with Node(4), all updates can be made consistently in one place and will ensure that the knowledge semantics are correctly expressed. Further, since concepts in the knowledge structure can be arbitrarily large, an important feature of the DAG application is the separation of the structure of the DAG and the actual information contained in each of the nodes of the DAG.

The DAG application includes a mechanism by which a data value can be associated with each DAG node such that the data value can be separately maintained and shared. A data value can be a topic category, a concept, one or more text terms, or a larger text object. In most cases (e.g., for knowledge taxonomies and knowledge ontologies), the data value node is shared. In addition, the DAG node used to form the structure of the total DAG can also be shared. This can be accomplished by associating a Data Node with each DAG Node, and then using bi-directional indexing to determine what data value concept is associated with which DAG Nodes, and the inverse, given a concept, determining all DAG Nodes that use the specified concept (in either a single DAG or across DAGs).

In DAGs where data values need to be shared, the basic insertion and deletion algorithms described above can be extended in the following manner:

DAG Node Insertion With Sharing:
1. Check to see if a Data Node already exists with the new Data Node value.
2. If a matching Data Node does not exist, create one and a new ID, also create a corresponding DAG Node and a new ID for the DAG Node.
3. If a matching Data Node was found, get it's ID and it's associated DAG Node ID.
4. Using the Data Node ID from step 2 or 3 above, connect the DAG Node into the DAG at the specified location.
5. Update the DAG Path table as described above.

DAG Node Deletion With Sharing:
1. Locate the DAG Node and it's associated Data Node to be deleted.
2. If the located DAG Node is only referenced by other DAG Nodes in the current DAG, delete the DAG Node.
3. If the located DAG Node is referenced by other DAG Nodes in other DAGs, only delete the links from the referencing DAG Nodes in this DAG.
4. Locate all DAG Nodes that are associated with the Data Node.
5. If there are no other references to the located Data Node, delete the Data Node. Otherwise, if there are other references, leave the Data Node since DAG Nodes in other DAGs still reference the data value stored in this DAG Node.
6. Update the DAG Path table as described above.

Consider the following node sharing example where two content taxonomies are to be constructed. The first taxonomy organizes people by job roles. In some cases, an individual may have multiple roles. The second taxonomy indicates which individuals are working on which product. DAG Nodes are indicated by circles, DAG Node IDs are indicated by a number. Data Nodes are indicated by rectangles, data node values are shown as text.

In the left-side of FIG. 7D, Karen, Mary, and John have roles as Graphic Designers. John, Dave, Travis, and Karen have roles as Programmers. Additionally, Dave, John, and Karen work on Photoshop. Karen, Travis, and Mary work on Acrobat. The two different taxonomies present different views or perspectives over the same people entities. The ability to support multiple hierarchical views of information is an important aspect of the DAG application and directly supports the concept of faceted taxonomies and ontologies.

The DAG systems and techniques support two separate policies for sharing DAG nodes. Each policy is material for constructing and representing a semantic network or arbitrary DAG. The first policy considers that DAG nodes are shared within the same DAG only. The second policy assumes that DAG nodes are potentially shared with other DAGs. By enforcing the first policy, the invention can ensure that a DAG that is not a tree can be represented efficiently as a DAG. Furthermore, DAG Nodes can be represented independently of other DAG Nodes that refer to the same Data Node, preserving the distinct semantic relationships between other nodes in the graph. The second policy reduces the number of nodes created and moreover allows networks of DAGs to be interconnected.

FIG. 7D illustrates the procedure for adding a new element in both cases. When a new element is added into any DAG with shared nodes, the DAG systems and techniques can locate and use a matching existing value. Assume the first taxonomy for Roles exists, and Dave is to be added into the second taxonomy. Data Node(Dave) is located, associated DAG Node(12) is created, and DAG Node (12) is connected to Product taxonomy DAG Node(10). This results in the "Dave" Data Node being shared by both Role and Product Taxonomies, but the DAG node is not shared (then both taxonomies can later explicitly represent different knowledge about the DAG Node having Data Node (Dave)). This example and both completed taxonomies are shown on the right-hand side of FIG. 7D. In the second scenario, the node to be added to one taxonomy is structurally shared with another taxonomy. Assume that John is to be added to the second taxonomy. Data Node (John) is located, associated DAG Node (6), shared with the Role taxonomy, is located, and DAG Node (6) is connected to Product taxonomy DAG Node(10).

Given two types of nodes (DAG and Data nodes), and given that each node type can be either shared or non-shared, this gives rise to the following truth-table which enumerates the various sharing models presented by the DAG application.

TABLE 1

|  | DAG Node | Data Node |
|---|---|---|
| Replicate sub-DAGs | Unshared | Unshared |
| Share concepts, DAG is always a tree structure | Unshared | SHARED |
| Not used (means multiple Data Nodes may be attached to common DAG Node) | SHARED | Unshared |
| Share concepts, minimize storage; supports Bayesian Belief Networks | SHARED | SHARED |

The DAG application provides a mechanism to select the appropriate sharing model. By default, both DAG Nodes and Data Nodes can always be shared.

In addition, rather than enumerating a full node list for each respective path, as described above, DAG path compression can be employed in a DAG Path Table by factoring out common prefix paths. This DAG path compression can involve shortening the Path Node List by referring to sub-paths using the Path ID in the Path Node List. Alternatively, this DAG path compression can involve shortening the Path Node List and having fewer entries in the DAG Path Table by referring to arbitrary sub-paths by a placeholder, such as "C" (although this can potentially result in more expensive queries).

Referring to the graph of FIG. 7A, path entries 5 and 8 can be compressed as follows. FIG. 7E shows an example DAG path table with path compression implemented using references to the Path ID in the Path Node List, rather than fully enumerating the path. Thus, "(1) (2) (4)" of entry 5 is replaced by "P4 (6)", where the "P4" token indicates the Path Node List of entry 4, and the "(6)" token indicates the addition of Node (6) to the referenced sub-path P4. Likewise, "(1) (5) (4)" of entry 8 is replaced by "P7 (6)", where the "P7" token indicates the Path Node List of entry 7, and the "(6)" token indicates the addition of Node (6) to the referenced sub-path P7.

This approach to path compression can result in considerably shorter path lists, which can result in smaller tables (e.g., reduced string lengths with the same number of rows) particularly when the fan out is large (and also when a node with descendants may have multiple parents, and many paths too the root). However, in this case, a new token index entry is created for each path ID that is compressed, and the additional complexity may require multiple roundtrip operations for inference chain retrieval and sub-graph retrieval. Reducing these additional round-trip requests to query the database can be accomplished by using a caching mechanism to store previously seen path IDs and their expansions, and then periodically updating this cache.

Updates and deletions to the graph can continue operate as described above. The retrieval algorithms can be as follows:

To retrieve all descendants of a node having DAG Node ID N:

1) Fetch all paths having N as an ID in the Path Node List
2) Trim all fetched path node lists so that N is the first node in each list
3) Retrieve all nodes from the lists, add them to Descendants
4) Collect the path IDs in P
5) While there are path IDs in P
   a. Retrieve all path node lists that contain as a list element a path ID in P
   b. Set P to the empty set
   c. Collect the nodes in these retrieved lists into Descendants
   d. Collect the paths signified in these lists into P
   e. Set P to the path IDs of the retrieved paths
6) Descendants is the set of all nodes that are descendants of N. To retrieve the structure of the graph, use the paths fetched or batch query the adjacency list for all the nodes. To retrieve the node values, query the DAG NodeData view To retrieve all paths from a node N to the root:

1) Fetch all paths having L(N) as the leaf ID into S
2) Collect the path IDs in P
3) While there are path IDs in P
   a. Retrieve all path node lists that contain as a list element a path id in P. Call this set K.
   b. Using K, rebuild all paths in S referring to a path in P
   c. Reset P to consist of all path IDs in all lists in K
4) S is the set of all paths from N to the root node. The IDs in these paths can be used to, query the DAG NodeData view for the node names.

FIG. 7F shows another example DAG path table with path compression (for the graph of FIG. 7A) implemented using references to the leaf node of a compressed path, including a prefix in the path node list that signifies the compressed path, such as "C", instead of fully enumerating the path or including a path ID. This is analogous to the previous path compression algorithm: for every path that is referenced in a path node list, rewrite the path node list to have the prefix C and suffix the leaf node of the path followed by the other nodes in the path node list.

Entry 8 has been removed because path 8 is already represented by path 5 above. Path 5 in this table represents the original path 5 (1 2 4 6) and the original path 8 (1 5 4 6) in the uncompressed table. Referring to the retrieval algorithms, any path that has 4 as a leaf will prefix any other path that has as tokens in it's path string "C" followed by "4". Thus, the "C" can be visualized as being a signifier that the nodes following it connect to another path, and in this example, the nodes following "C" connect to paths 4 and 7 by Node (4)

The retrieval algorithms here can be as follows:

To retrieve all descendants of a node having DAG node ID N:
1) Fetch all paths having N as an ID in the Path Node List
2) Trim all fetched path node lists so that N is the first node in each list
3) Collect in P all leaf nodes on the fetched paths
4) Retrieve all nodes from the lists, Descendants
5) While there are node IDs in P
   a. Retrieve all path node lists that contain "C" as a first element followed by a node ID that is in P
   b. Set P to the empty set
   c. Collect the nodes in these retrieved lists into Descendants
   d. Collect the leaf nodes on these paths into P
6) Descendants is the set of all nodes that are descendants of N. To retrieve the structure of the graph, use the paths fetched or batch query the adjacency list for all the nodes. To retrieve the node values, query the DAG NodeData view To retrieve all paths from a node N to the root:
1) Fetch all paths having L(N) as the leaf ID into S
2) For all paths in S beginning with "P", collect the node ID that follows the letter "P" into P
3) While there are node IDs in P
   a. Retrieve all path node lists that contain as a leaf node a node ID in P. Call this set K.
   b. Using K, rebuild all paths in S referring to a path in P
   c. Reset P to consist of all path IDs in all lists in K
4) S is the set of all paths from N to the root node. The IDs in these paths can be used to, query the DAG NodeData view for the node names.

This second approach can result in greater compression of the path table. However, this second approach may also make the queries more expensive or require more filtering: step 5a in retrieving a sub-graph, for example, imposes a requirement on the second "element" of the path node list, which is a more expensive query operation than a query on an individual (indexed) token. In both path compression examples above, only select paths in the graph have been compressed: paths for which the leaf node had multiple parents. Thus, only the paths 5 and 8 in the original table in FIG. 7A were compressed.

As before, the basic operations used are inserting, deleting, and fetching nodes from the DAG structure and updating the DAG Path table to reflect these operations. All operations on the DAG can be expressed using a combination of the primitives A-H defined below:

A. Find all directed paths between Node A and Node B:
   Find all paths having both A and B in any order, having one of them as a leaf.
   Find all paths having A as a leaf and some compressed path; of the referenced paths, retrieve the paths that contain B
   Find all paths having B as a leaf and some compressed path; of the referenced paths, retrieve the paths that contain A B. Find all minimum length undirected paths between Node A and Node B (algorithm unchanged):
   1. Find all directed paths between Node A and Node B, call this set Pi.
   2. Find all paths Pa from Node A to the Root Node, but not having Node B. Find all paths Pb from B to the Root Node, but not having Node A. Take the cross product of these two sets:

$P = Pa \times Pb$ for each pair in the cross product P, if the length of the shortest common prefix on the path is k, remove the first k−1 nodes from each of the two paths. This gives two paths that, when joined by their single common leftmost node, form an undirected path between A and B.
   3. Note that the cross product may remove redundant nodes on any resulting path, (e.g., path between A and D in a graph rooted at C is A,B,C,B,D, but the shortest path is simply A,B,D)
   4. The union of P and Pi together represent all undirected paths between Node A and Node B.

Insertion Algorithm
C. Insert a new Node into the DAG. When a new node is added, the following algorithm can be used (both of these algorithms are the same as in the non-compressed case, since a compressed path reference is always followed by at least one node ID, so the task of finding all paths that have O as a leaf node, for example, is unchanged):
   Case 1: Node is to be a root
      1. Record the node data if it does not exist.
      2. Create a DAG node N that references the new node
      3. Insert the new path consisting of the DAG node, and an identifier for the leaf node N of the path
   Case 2: Node is to be a child of some other node O
      1. Record the node data if it does not exist.
      2. Create a DAG node N that references the new node
      3. Find all paths (only the rows) that have O as a leaf node. Call these paths Po. Let Pn be the set consisting of the path having just node N. Connect all paths in Po to all paths in Pn by the cross product of Po and Pn:

$Po \times Pn$

D. Insert a new Edge into the DAG having source Node SRC and destination Node DST. When a new edge is added, the following algorithm can be used:
   1. Find all paths that the SRC Node is a leaf of. Call these paths Pi
      a. This is analogous to finding all paths from SRC to the root, or all "inference chains" ending in SRC
   2. Find all distinct paths that DST Node is a Root Node of. Call these paths Pj
      a. This is exactly analogous to the algorithm for finding all descendants of DST: first all paths containing DST are sought, and then all compressed paths referencing any of those paths are also sought. In the first compression approach, this is accomplished by searching for the compressed paths having the path IDs in question referenced; in the second compression approach, this amounts to finding all compressed paths beginning with P followed by the node id in question (a leaf node of one of the retrieved paths)
   3. Connect all paths in Pi to all paths in Pj by the cross product of Pi and Pj:

$Pi \times Pj$

Deletion Algorithm
E. Delete a Node from the DAG. When an existing node is deleted, the following algorithm can be used:
   1. Locate all paths that the node is on
      a. In the compressed case, this amounts to locating referenced/compressed paths as well: first any path containing the node, then any path referencing an existing path (and the process repeated until there no more new paths referenced)
2. Delete those paths.

Note that this deletes all nodes which do not have ancestors other than Node.

H. Delete an Edge from the DAG. When an existing edge is deleted, the following algorithm can be used:
  1. Locate all paths that the Edge is on
  2. Delete those paths.

Note that if DST has no other parent besides SRC, where SRC and DST are the source and destination of Edge (respectively), then this operation is equivalent to deleting DST.

This algorithm is a slightly more intricate case where paths are compressed:

In the first compression algorithm that uses the pathID, this amounts to finding all paths that contain SRC followed by DST, plus all compressed paths that have as a first non-compressed node DST, and reference a path having SRC as a leaf, and deleting those paths. In the second algorithm, the algorithm for deletion of an edge is unchanged, since no paths are explicitly mentioned and all edges are explicitly captured in the path lists.

Typical uses of DAGs in semantic networks apply to DAGs that are mostly trees. That is, most of the nodes have only one parent, while some may have more, but likely fewer than three. Thus, a data structure that represents generalized DAGs is needed, the implementation of this data structure that is most convenient for DAGs that are nearly trees is likely preferred. The path compression approaches described above are generally well suited for this. Because typical DAGs in many implementations are mostly trees, the advantage of the second compression approach over the first compression approach may be small. Moreover, the second compression approach may involve more expensive queries since the database token indexing method may not account for the ordinal value of the tokens. Therefore in implementations where the DAGs are mostly trees, the first compression approach may be preferred over the second compression approach.

In addition, it should be noted that path compression offers several potential space-saving advantages. Important considerations include the decision about when to compress paths (upon any update or in batch modes offline) and the decision about which paths to compress. Regarding the latter consideration, one could compress all paths in a DAG, so that, for example, a path node list never has more than two node IDs, and always has a compressed path (except at the root). However, this may be undesirable as it tends to negate the advantages of path enumeration and lexical indexing described herein. With that being observed, suitable heuristics for compression can be tailored to the kinds of graphs and the kinds of updates expected to be made to the graph in order to optimize the queries and the space required.

One heuristic is to always compress paths that have at least four nodes. Another heuristic is to compress based on in-degree and out-degree. For instance, two children of a node share all the same paths of a node to the root, so a good candidate heuristic for path compression is at nodes that have more than 4 children. If those children have descendants, that may be an even better candidate for path compression. Another important consideration is to compress paths at nodes that have more than one parent.

Path compression can be integrated with the insertion and deletion algorithms to ensure constraints on path length and depth as well as in-degree are enforced. Alternately, path compression can be applied offline in batch mode to enforce constraints. Path compression may be a combination of both approaches: consider, for example, the insertion of a sub-graph as a child of some other node N; paths from N to the root can be compressed online.

In many implementations, graphs are largely created in memory during augmentation, or augmented by adding multi-node sub-graphs. Therefore, path compression over the entire DAG can be deferred to batch mode, or occur during persistence of the DAG, in order to allow optimal path compression. For the DAGs described in herein, it is expected that the updates (edge and node insertions and deletions) will likely alter the graph slowly over time, so the compression can occur in batch mode unless a multi-node sub-graph is inserted. Moreover, since the graphs used in many implementations are mostly trees, it may preferable to use the first compression approach, and compresses paths for paths that have four or more nodes and for which the leaf node has either out-degree at least four or in-degree at least two.

Figure 8:
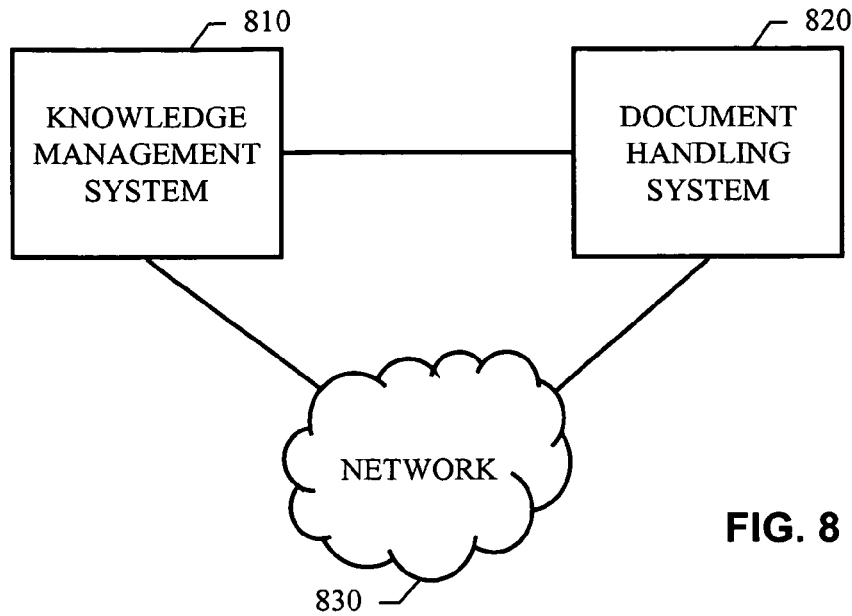
FIG. 8 is a block diagram showing an example system implementation.

Leaving the DAG systems and techniques and once again referring to the present application, the described techniques can be implemented in many different types of systems. FIG. 8 is a block diagram showing an example system implementation. A knowledge management system 810 can employ the techniques described above to build and maintain a hierarchical knowledge structure that categorizes information according to cognitive and semantic qualities within a knowledge domain.

The hierarchical knowledge structure can include discrete knowledge types included within a common information category of the hierarchical knowledge structure, where the discrete knowledge types include knowledge represented explicitly through domain vocabulary words and relationships among the domain vocabulary words, and the discrete knowledge types include knowledge represented as designated sample data to be processed using statistical machine learning analysis. As will be appreciated, these discrete knowledge types (e.g., symbolic knowledge and statistical-based machine learned knowledge) represent different points of view of knowledge in the knowledge domain, and employ discrete knowledge extraction methods. Thus, implementations of this hierarchical knowledge structure can be viewed as a multi-faceted ontology contained within a single data structure.

The knowledge management system 810 can include a computer program product operable to cause data processing apparatus to process the discrete knowledge types and to effect a programming interface used to access the hierarchical knowledge structure. The knowledge management system 810 can be coupled with a document handling system 820, such as through a network 830. The network 830 can be an enterprise network (e.g., a local area network), a public network (e.g., the Internet), or combination of these or other computer networks (e.g., a mobile device network).

The document handling system 820 can be configured to use the programming interface of the knowledge management system 810 to access and obtain information from the knowledge management system 810. The document handling system 820 can be an enterprise workflow system, a resource management system (e.g., an enterprise relationship management (ERM) system or a customer relationship management (CRM) system), or a content management system (e.g., a document repository or document archiving system).

In general terms, nearly any application that requires the storage, access, and organization of domain knowledge can use the present systems and techniques to implement such application's knowledge management functionality. Implementations are not limited to large enterprise systems such as those listed above, but can also include personal computer programs where there is a need to organize related help information, best-practices, and resource libraries, etc. Examples include various software products provided by Adobe Systems Incorporated of San Jose, Calif., such as PHOTOSHOP® software (e.g., for creating ontologies of image resources such as tools, palettes, brushes, textures, filters), ADOBE AUDITION® software (e.g., for creating ontologies of audio special effects, filters, and complex audio mix workflows), and video editing products such as ADOBE PREMIERE® software (e.g., for creating ontologies of video effects, backgrounds, and stock video content).

Figure 9:
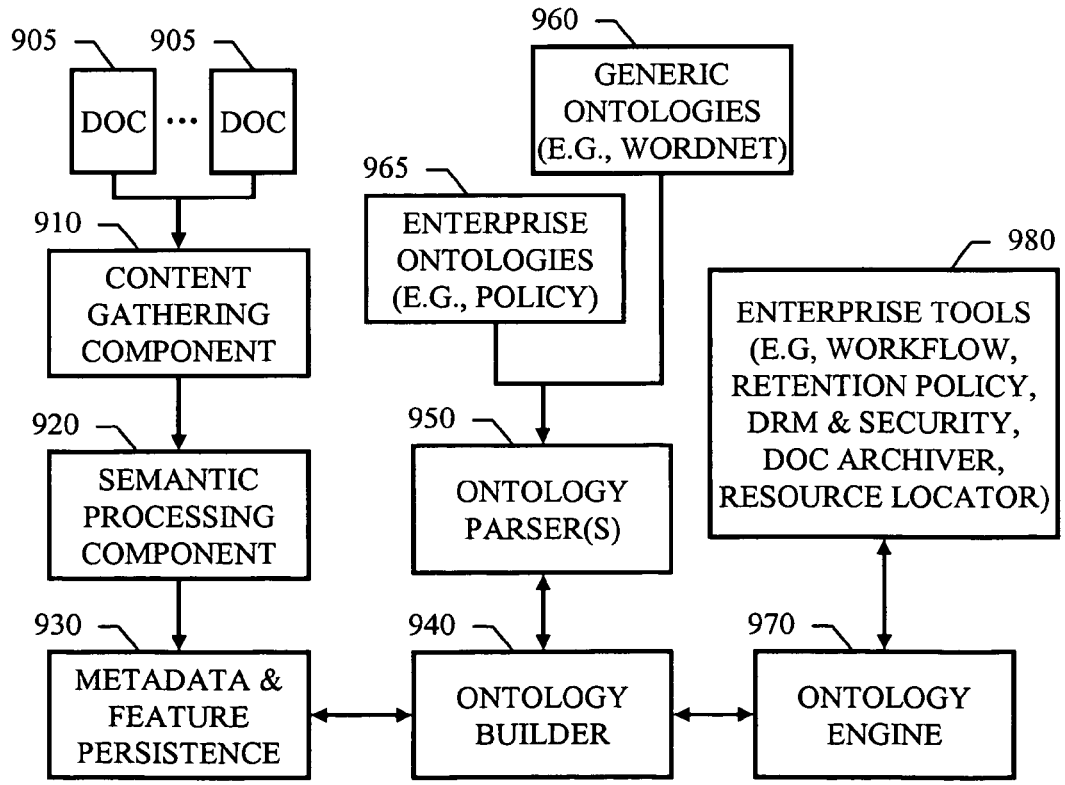
FIG. 9 is a block diagram showing another example system implementation.

FIG. 9 is a block diagram showing another example system implementation. Training documents 905 can be provided to a content gathering component 910. The content gathering component 910 can be coupled with a content management system, and can include multiple document crawlers and text extraction filters, which identify and extract useable text from the training documents 905. Extracted text can be supplied to a semantic processing component 920. The semantic processing component 920 can include one or more semantic feature extractors, plus categorizer(s) and summarizer(s). Moreover, the semantic processing component 920 can include one or more application programming interfaces (APIs), e.g., a generic API that provides a standard set of interfaces, allowing numerous commercial and experimental third-party semantic processors to be plugged in and used.

Output from the semantic processing can be provided to metadata and feature persistence 930, which can include one or more databases. The persistence services provided by the metadata and feature persistence 930 can be Extensible Markup Language (XML) based and can also employ Extensible Metadata Platform (XMP) metadata processing services. The metadata and feature persistence 930 can be coupled with multiple ontology management components, including an ontology builder 940. The ontology builder 940 can employ the techniques described herein to build a hybrid ontology for use by other system components.

One or more ontology parsers 950 can mine symbolic knowledge from existing symbolic ontologies. These can include one or more generic ontologies 960 (e.g., WORD-NET®) and one or more enterprise ontologies 965 (e.g., an enterprise document retention policy ontology). The mined symbolic knowledge can be provided to the ontology builder 940 for use in augmenting a seed ontology as described above.

One or more hybrid ontologies can be created by the ontology builder 940, and an ontology engine 970 can provide access to these hybrid ontologies. The ontology engine 970 can provide query (e.g., document or search string) processing services to various enterprise tools 980. The enterprise tools 980 can include document workflow management tools, document retention policy tools, summary and reporting tools, digital rights management (DRM) and document security tools, document archiving tools, resource locator tools, XMP metadata generator tools, etc.

In general, the enterprise tools 980 can use the ontology engine 970 to access a hybrid ontology to discover information relating to a query. The discovered information can benefit from discrete knowledge types in the knowledge domain in that the ontology engine 970 can retrieving information from the hybrid ontology based on the query, where this retrieving involves combining contributions of pertinence, with respect to the query, from both statistically machine-learned features and symbolic knowledge in the hybrid ontology. Moreover, the query can include a balancing factor, and combining contributions of pertinence can involve adjusting the contributions from the machine-learned features and the symbolic knowledge based on the balancing factor, which can be a user-controlled input.

The ontology engine 970 can support information discovery in a hybrid ontology for various purposes, including resource mining (e.g., identifying an author of documents related to a search string to find an expert in a particular area) and document classification (e.g., identifying an appropriate document category in a content management system for a new document).

Figure 10:
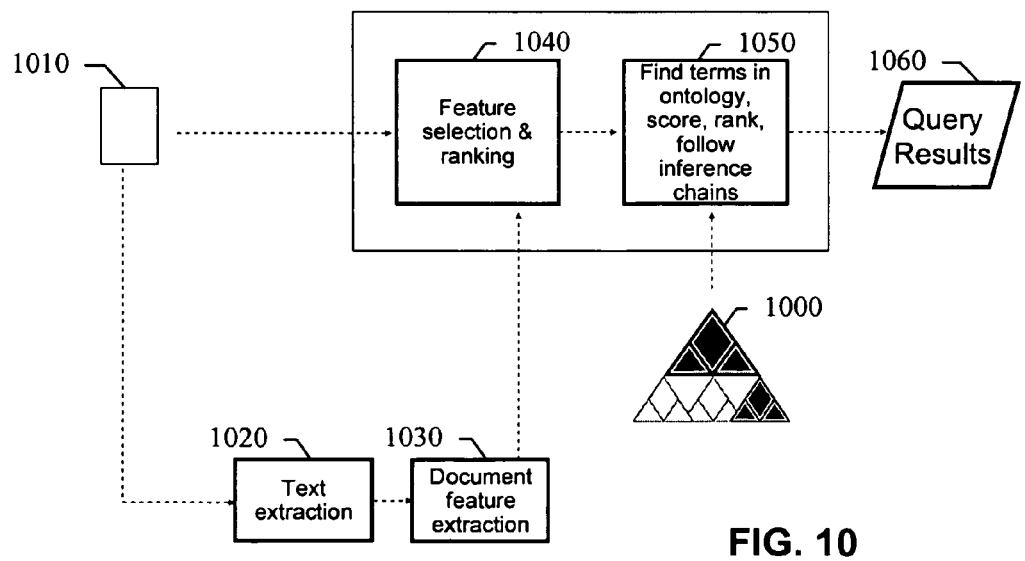
FIG. 10 is a block diagram showing an example process of using an ontology.

FIG. 10 is a block diagram showing an example process of using an ontology. During run-time, a populated hybrid ontology 1000 has already been created. The ontology 1000 can be used for a variety of text mining operations, such as categorizing and classifying documents, where the run-time operations can include search or query operations against the ontology data structure 1000. Note that traditional text and database indexing methods can be used here.

New documents can be submitted to the system for categorization. During the run-time query processing, a new unknown document 1010 can be submitted to the system. Document text can be extracted at 1020, lexical or semantic features can be extracted from the text at 1030, and these extracted feature can be used to form a feature vector for the new document 1010 to be classified. Features can be extracted from a query (e.g., the document 1010 to be classified) in the same way that they are extracted from the example documents used to grow the ontology. Using the same example ontology described above in connection with FIG. 3, if a new unknown query document is a resume document, then the terms and their frequencies are extracted.

Once features from the new unknown resume document are extracted and available, the system can rank the features at 1040. The ranked features can then be used at 1050 to query the augmented ontology data structure to find matches with feature terms that were assigned to the ontology categories during the earlier symbolic and machine learning operations used to initially build the ontology. The search results can be ranked at 1050 by the most relevant ontology terms that match the terms or features of the query document. Each ontology node that matches can be associated with a cumulative score that depends on the value of the feature in the query document. Moreover, inference chains can be followed at 1050 to return the root categories (or other information sought, such as document authors who may be experts in the technical area of the query document).

Query results 1060 can then be provided as output to a user or to another system component. For instance, all matches and rank scores can be reported back to indicate the best corresponding categories under which the new document should be categorized. All of the query document's features can be used in the ontology query, but the scores of individual ontology nodes can be used to determine the confidence of the classification. For example, if the most relevant term is "experience", and it has a rank of 0.3, then if the "Resumes" concept has been associated with sub concept "experience", then the "Resumes" node can receive a rank based on the value 0.3 (in particular, the "experience" node can receive the rank 0.3, and the "Resumes" node receives rank 0.3/3=0.1). The query results 1060 can have the following form: category C1 0.40; category C2 0.35; category C3 0.02. Moreover, if the variance of the classification scores is above a variance threshold, then the classification can be deemed "unknown". This allows the classification system to determine when it does not know into which class a query document belongs, rather than misclassifying the document into an incorrect category.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

Moreover, the described systems and techniques can be implemented using a variety of ontology and machine learning techniques. The described infrastructure allows different ontology and machine learning methods to be incorporated into one knowledge hierarchy. Thus, additional implementations can involve the use of decision tree constructors, Conditional Random Field (CRF) techniques, belief networks, and other kinds of undirected graphical models (given similar heuristics for mapping learned relationships) to augment the ontology. In addition, a hybrid ontology can be augmented directly, by identifying concepts or features in text and clustering them in a flat or hierarchical fashion; this can be accomplished using statistical machine learning methods.

What is claimed is:

1. A computerized method for building hierarchical knowledge structures comprising
receiving a first ontology including initial categories, an indication of sample data for a given category of the initial categories, and an indication of symbolic knowledge for the given category; and
populating the first ontology with new features to form a second ontology for use in document categorization, the populating comprising determining the new features from the sample data using a statistical machine learning process and retaining the new features and the symbolic knowledge within the second ontology in association with the given category, wherein the sample data comprises sample documents, and the determining comprises:
extracting attributes from the sample documents;
calculating a statistical concept-distance metric for the attributes;
selecting a first subset of the attributes that are more distinguishing with respect to the sample documents based on the calculated statistical concept-distance metric for the attributes and a first user-controllable input; and
selecting a second subset of the first attribute subset based on the given category and a relevance measure for attributes in the first attribute subset with respect to the given category, the relevance measure being affected by a second user-controllable input;
wherein the new features comprise attributes in the second attribute subset.

2. The method of claim 1, wherein the calculating comprises calculating information gain for an attribute A in relation to documents S and categories C by which the documents S are grouped, and the calculating the information gain comprises handling separately a subset of the documents S, for which the attribute A is absent, to improve performance with respect to populating sub-concepts in the second ontology.

3. The method of claim 2, wherein the handling separately comprises using a fraction of entropy associated with the document subset for which the attribute A is absent.

4. The method of claim 2, wherein the calculating the information gain comprises calculating a smoothed zero-value information gain (SZVIG) in accordance with an equation:

$$SZVIG(A) = H(S) - \frac{1}{C} \cdot \frac{|S^{A=0}|}{|S|} H(S^{A=0}) - \sum_{v \in V_A, v \neq 0} \frac{|S^{A=v}|}{|S|} H(S^{A=v});$$

wherein $V_A$ is a set of values v for the attribute A for the documents S,
$S^{A=v}$ is a partition of the documents S based on $V_A$, and
$H(x)$ is a determined entropy of a set x.

5. The method of claim 2, wherein the determining comprises discretizing frequency values $V_A$ for the attribute A in the documents S based on a statistical variance of the frequency values $V_A$; and wherein input for the calculating the information gain includes the discretized frequency values.

6. The method of claim 5, wherein the discretizing comprises grouping the frequency values $V_A$ based on a maximum per-group variance determined according to a third user-controllable input.

7. The method of claim 1, wherein the determining comprises determining a variance in the calculated statistical concept-distance metric for the attributes, and wherein the selecting the first subset comprises selecting the first subset based on the first user-controllable input combined with the determined variance in the calculated statistical concept-distance metric for the attributes.

8. The method of claim 1, wherein the determining comprises determining a variance in frequency values for the attributes, and wherein the relevance measure is affected by the second user-controllable input combined with the determined variance in the frequency values for the attributes.

9. The method of claim 1, wherein the indication of symbolic knowledge comprises a tag and a keyword, the tag indicating an existing symbolic ontology, and the populating comprising mining the existing symbolic ontology based on the keyword to obtain the symbolic knowledge.

10. The method of claim 9, wherein the existing symbolic ontology comprises a public ontology of an online lexical reference system, and the mining comprises accessing the online lexical reference system over a network.

11. The method of claim 9, wherein the indication of sample data comprises a second tag and references to sample documents, the second tag indicating the statistical machine learning process selected from multiple available statistical machine learning processes.

12. The method of claim 1, further comprising:
receiving a query; and
retrieving information from the second ontology based on the query, the retrieving comprising combining contributions of pertinence, with respect to the query, from the machine-learned new features and the symbolic knowledge.

13. The method of claim 12, wherein the query includes a balancing factor, and the combining comprises adjusting the contributions from the machine-learned new features and the symbolic knowledge based on the balancing factor.

14. The method of claim 12, wherein the query comprises a document, and the retrieving comprises identifying a category for the document.

15. The method of claim 12, wherein the query comprises a search string, and the retrieving comprises:
identifying a document related to the search string; and
obtaining information associated with the identified document.

16. A computer program product, encoded on a computer-readable medium, operable to cause data processing apparatus to perform operations comprising:

receiving a first ontology including initial categories, an indication of sample data for a given category of the initial categories, and an indication of symbolic knowledge for the given category; and populating the first ontology with new features to form a second ontology for use in document categorization, the populating comprising determining the new features from the sample data using a statistical machine learning process and retaining the new features and the symbolic knowledge within the second ontology in association with the given category, wherein the sample data comprises sample documents, and the determining comprises:

extracting attributes from the sample documents;

calculating a statistical concept-distance metric for the attributes;

selecting a first subset of the attributes that are more distinguishing with respect to the sample documents based on the calculated statistical concept-distance metric for the attributes and a first user-controllable input; and selecting a second subset of the first attribute subset based on the given category and a relevance measure for attributes in the first attribute subset with respect to the given category, the relevance measure being affected by a second user-controllable input;

wherein the new features comprise attributes in the second attribute subset.

17. The computer program product of claim 16, the operations further comprising:

receiving a query; and retrieving information from the second ontology based on the query, the retrieving comprising combining contributions of pertinence, with respect to the query, from the machine-learned new features and the symbolic knowledge.

18. A computerized system comprising:

a knowledge management system including a hierarchical knowledge structure that categorizes information according to cognitive and semantic qualities within a knowledge domain, the hierarchical knowledge structure including discrete knowledge types included within a common information category of the hierarchical knowledge structure, the discrete knowledge types including knowledge represented explicitly through domain vocabulary words and relationships among the domain vocabulary words, and the discrete knowledge types including knowledge represented as designated sample data to be processed using statistical machine learning analysis, wherein the knowledge management system includes a computer program product operable to cause data processing apparatus to process the discrete knowledge types and to effect a programming interface used to access the hierarchical knowledge structure; and a document handling system configured to use the programming interface to access and obtain information from the knowledge management system; wherein the computer program product is operable to cause data processing apparatus to perform operation comprising:

extracting attributes from the sample data;

calculating a statistical concept-distance metric for the attributes;

selecting a first subset of the attributes that are more distinguishing with respect to the sample data based on the calculated statistical concept-distance metric for the attributes and a first user-controllable input; and selecting a second subset of the first attribute subset based on the given category and a relevance measure for attributes in the first attribute subset with respect to the given category, the relevance measure being affected by a second user-controllable input; and augmenting the hierarchical knowledge with the second attribute subset.

19. The system of claim 18, wherein the computer program product is operable to cause data processing apparatus to perform operations comprising:

mining an existing symbolic knowledge resource based on a keyword; and augmenting the hierarchical knowledge structure with results of the mining to add to the knowledge represented explicitly through domain vocabulary words and relationships among the domain vocabulary words.

20. The system of claim 19, wherein the computer program product is operable to cause data processing apparatus to perform operations comprising retrieving information from the hierarchical knowledge structure based on a received query, the retrieving comprising combining contributions of pertinence, with respect to the received query, from the discrete knowledge types.

21. The system of claim 18, wherein the document handling system comprises an enterprise workflow system.

22. The system of claim 18, wherein the document handling system comprises a resource management system.

23. The system of claim 18, wherein the document handling system comprises a content management system.

24. The computer program product of claim 16, wherein the calculating comprises calculating information gain for an attribute A in relation to documents S and categories C by which the documents S are grouped, and the calculating the information gain comprises handling separately a subset of the documents S, for which the attribute A is absent, to improve performance with respect to populating sub-concepts in the second ontology.

25. The computer program product of claim 24, wherein the handling separately comprises using a fraction of entropy associated with the document subset for which the attribute A is absent.

26. The computer program product of claim 24, wherein the calculating the information gain comprises calculating a smoothed zero-value information gain (SZVIG) in accordance with an equation:

$$SZVIG(A) = H(S) - \frac{1}{C} \cdot \frac{|S^{A=0}|}{|S|} H(S^{A=0}) - \sum_{v \in V_A, v \neq 0} \frac{|S^{A=v}|}{|S|} H(S^{A=v});$$

wherein $V_A$ is a set of values v for the attribute A for the documents S, $S^{A=v}$ is a partition of the documents S based on $V_A$, and H(x) is a determined entropy of a set x.

27. The computer program product of claim 24, wherein the determining comprises discretizing frequency values $V_A$ for the attribute A in the documents S based on a statistical variance of the frequency values $V_A$; and wherein input for the calculating the information gain includes the discretized frequency values.

28. The computer program product of claim 27, wherein the discretizing comprises grouping the frequency values $V_A$ based on a maximum per-group variance determined according to a third user-controllable input.

29. The computer program product of claim 16, wherein the determining comprises determining a variance in the calculated statistical concept-distance metric for the attributes, and wherein the selecting the first subset comprises selecting the first subset based on the first user-controllable input combined with the determined variance in the calculated statistical concept-distance metric for the attributes.

30. The computer program product of claim 16, wherein the determining comprises determining a variance in frequency values for the attributes, and wherein the relevance measure is affected by the second user-controllable input combined with the determined variance in the frequency values for the attributes.

31. The computer program product of claim 16, wherein the indication of symbolic knowledge comprises a tag and a keyword, the tag indicating an existing symbolic ontology, and the populating comprising mining the existing symbolic ontology based on the keyword to obtain the symbolic knowledge.

32. The computer program product of claim 31, wherein the existing symbolic ontology comprises a public ontology of an online lexical reference system, and the mining comprises accessing the online lexical reference system over a network.

33. The computer program product of claim 31, wherein the indication of sample data comprises a second tag and references to sample documents, the second tag indicating the statistical machine learning process selected from multiple available statistical machine learning processes.

34. The computer program product of claim 17, wherein the query includes a balancing factor, and the combining comprises adjusting the contributions from the machine-learned new features and the symbolic knowledge based on the balancing factor.

35. The computer program product of claim 17, wherein the query comprises a document, and the retrieving comprises identifying a category for the document.

36. The computer program product of claim 17, wherein the query comprises a search string, and the retrieving comprises:
 identifying a document related to the search string; and
 obtaining information associated with the identified document.

* * * * *